(12) United States Patent
Okamiya

(10) Patent No.: US 9,995,230 B2
(45) Date of Patent: Jun. 12, 2018

(54) ENGINE CONTROL DEVICE

(71) Applicant: DENSO CORPORATION, Kariya, Aichi-pref. (JP)

(72) Inventor: Minoru Okamiya, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days. days.

(21) Appl. No.: 15/416,070

(22) Filed: Jan. 26, 2017

(65) Prior Publication Data

US 2017/0211494 A1 Jul. 27, 2017

(30) Foreign Application Priority Data

Jan. 26, 2016 (JP) ................................ 2016-012331

(51) Int. Cl.
| | |
|---|---|
| *F02N 11/08* | (2006.01) |
| *F02D 41/04* | (2006.01) |
| *F02D 41/06* | (2006.01) |
| *F02N 15/06* | (2006.01) |

(52) U.S. Cl.
CPC ......... *F02D 41/042* (2013.01); *F02D 41/065* (2013.01); *F02N 11/0818* (2013.01); *F02N 11/0851* (2013.01); *F02N 11/0862* (2013.01); *F02N 11/0803* (2013.01); *F02N 11/087* (2013.01); *F02N 15/067* (2013.01); *F02N 2200/022* (2013.01); *F02N 2300/2011* (2013.01); *F02N 2300/304* (2013.01); *Y02T 10/48* (2013.01)

(58) Field of Classification Search
CPC .. F02D 41/042; F02D 41/065; F02N 11/0818; F02N 11/0862; F02N 11/0851; F02N 11/087; F02N 11/0803; F02N 11/0822; F02N 11/0848; F02N 2300/2011; F02N 2300/304; F02N 15/067; Y02T 10/48
USPC .................... 123/179.3, 179.4; 701/112, 113
See application file for complete search history.

(56) References Cited

FOREIGN PATENT DOCUMENTS

| | | |
|---|---|---|
| JP | 2014-009628 A | 1/2014 |
| JP | 5609826 B2 | 10/2014 |

*Primary Examiner* — Hai Huynh
(74) *Attorney, Agent, or Firm* — Oliff PLC

(57) ABSTRACT

In an engine control device, an automatic engine stop control section automatically stops an engine operating when an automatic engine stop condition is satisfied. An engine start control section supplies electric power to a starter to drive the starter when receiving an initial engine start intention signal transmitted from a push starter and when an automatic engine start condition has been satisfied. An engine start completion detection section detects whether the engine start of the engine has finished. An automatic engine stop permission section permits the automatic engine stop control section to stop the engine operating when the automatic engine stop permission section detects that the engine start has finished at a timing when the engine start control section has started the engine after receiving an initial engine start intention detection signal transmitted from the push starter.

16 Claims, 17 Drawing Sheets

ENGINE CONTROL DEVICE

CROSS-REFERENCE TO RELATED APPLICATION

This application is related to and claims priority from Japanese Patent Application No. 2016-012331 filed on Jan. 26, 2016, the contents of which are hereby incorporated by reference.

BACKGROUND OF THE INVENTION

1. Field of the Invention

The present invention relates to engine control devices capable of controlling the operation of an internal combustion engine mounted on a vehicle.

2. Description of the Related Art

There have been known and used vehicles equipped with an engine control device capable of providing an idling reduction function (or an idle stop function). The engine control device has the idling reduction function which automatically stops the operation of an internal combustion engine (hereinafter, the engine) when a predetermined engine stop condition is satisfied.

A patent document 1, Japanese patent No. 5609826 discloses a conventional engine control device. This conventional engine control device detects that a vehicle stopped state, i.e. the vehicle is stationary and the engine is still operating. In this situation, the conventional engine control device executes an automatic engine stop process so as to automatically stop the engine of the vehicle operating when the predetermined engine stop condition is satisfied in the vehicle stopped state. The engine control device having the automatic engine stop function can reduce fuel consumption of the vehicle.

In order to further reduce the fuel consumption of the vehicle, the conventional engine control device executes the automatic engine stop process in a decelerating state of the vehicle (hereinafter, the decelerating state) when detecting that the speed of the vehicle is reduced and the automatic engine stop condition is satisfied.

Still further, the conventional engine control device executes the automatic engine restart process so as to automatically restart the operation of the engine of the vehicle when a predetermined engine restart condition is satisfied after the engine has been stopped by the automatic engine stop process.

However, the conventional engine control device disclosed in the patent document 1 inhibits the execution of the automatic engine stop process in the decelerating state at least until the automatic engine stop process at the first time has been executed in the vehicle stopped state. That is, the conventional engine control device detects, in the vehicle stopped state, whether the automatic engine stop process, including the automatic engine stop process to be executed in the decelerating state, can be correctly executed. The conventional engine control device further attempts to avoid unexpected malfunction due to a problem in which the automatic engine stop process is not executed in the decelerating state in which the speed of the vehicle is reduced.

When the automatic engine start process is correctly executed after the automatic engine stop process at the first time has been executed in the vehicle stopped state, the conventional engine control device allows the execution of the automatic engine stop process during the decelerating state of the vehicle. That is, the conventional engine control device detects, during the vehicle stopped state, whether or not the automatic engine restart process is correctly executed. In addition, the conventional engine control device intends to avoid an occurrence of an unexpected uncomfortable state of the vehicle due to incorrect execution of the automatic engine stop process during the decelerating state.

The conventional engine control device inhibits the execution of the automatic engine stop process in the decelerating state, i.e. inhibits the execution of the automatic engine stop process until the automatic engine stop process at the first time has been executed in the vehicle stopped state.

Accordingly, the conventional engine control device cannot execute the automatic engine stop process in the decelerating state until the automatic engine stop process at the first time has been executed in the vehicle stopped state even if there is a possible opportunity to correctly execute the automatic engine stop process in the decelerating state. This prevents further fuel consumption reduction.

SUMMARY

It is therefore desired to provide an engine control device capable of detecting whether an automatic engine restart process can be executed at an initial engine start time, and increasing the number of times the automatic engine stop process.

An exemplary embodiment provides an engine control device to be mounted on a vehicle. The vehicle has an internal combustion engine, an initial engine start intention detection device, and an engine start device. In the engine control device, the initial engine start intention detection device detects a driver's initial engine start intention to start the internal combustion engine and generates and transmits an initial engine start intention signal, which corresponds to the detected driver's initial engine start intention, and the engine start device turns a driving shaft of the internal combustion engine when receiving electric power so as to execute an engine start of the internal combustion engine. The engine control device using a processor has an automatic engine stop control section, an engine start control section, an engine start completion detection section and an automatic engine stop permission section. The automatic engine stop control section automatically stops the internal combustion engine operating when an automatic engine stop condition is satisfied. The engine start control section supplies electric power to the engine start device so as to drive the engine start device when receiving the initial engine start intention signal transmitted from the initial engine start intention detection device and an automatic engine start condition is satisfied. The engine start completion detection section detects whether the engine start of the internal combustion engine has finished. The automatic engine stop permission section permits the automatic engine stop control section to stop the engine operating when the automatic engine stop permission section detects that the engine start of the internal combustion engine has finished at a timing when the engine start control section starts the operation of the internal combustion engine after the engine start control section receives the initial engine start intention detection device transmitted from the initial engine start intention detection device.

The engine control device having the structure previously described detects whether it is possible for the engine start control section to start the operation of the internal combustion engine at the initial engine start, i.e. during the vehicle is stationary. When the detection result indicates it is possible to start the internal combustion engine of the vehicle, the engine control device allows the automatic engine stop control section to stop the internal combustion engine. Accordingly, after the vehicle starts to run, it is possible for the automatic engine stop control section to stop the internal combustion engine operating even when the vehicle is running in an inertia travelling state or a decelerating state, and the automatic engine stop condition is satisfied before the vehicle is completely stopped. This makes it possible to increase an opportunity to execute the automatic engine stop, i.e. to increase the frequency of executing the automatic engine stop, and reduce the fuel consumption of the vehicle. The initial engine start indicates a case in which the internal combustion engine is started after the vehicle has been in the ignition off state (or ignition key-off state).

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
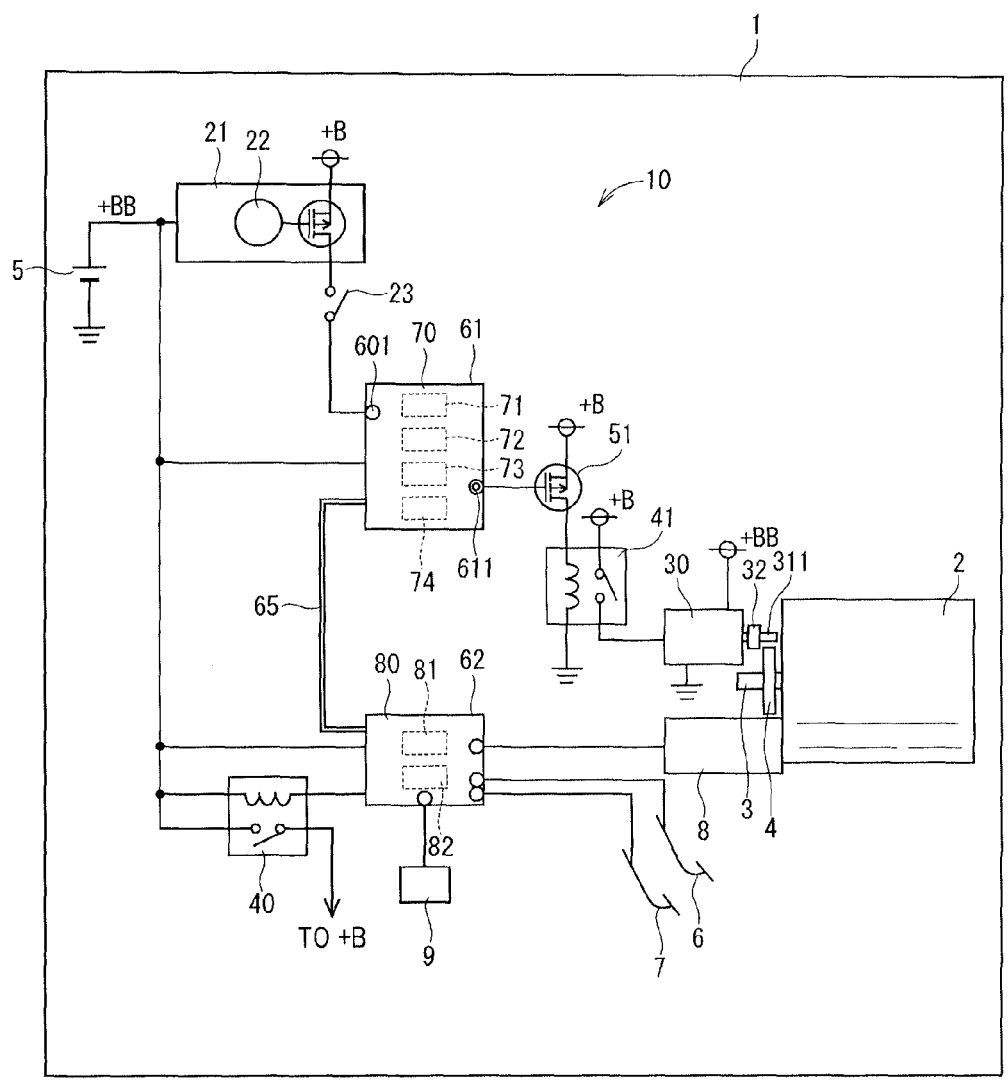
FIG. 1 is a schematic view showing an engine control device according to a first exemplary embodiment of the present invention and a vehicle equipped with the engine control device.

Hereinafter, various embodiments of the present invention will be described with reference to the accompanying drawings. In the following description of the various embodiments, like reference characters or numerals designate like or equivalent component parts throughout the several diagrams.

In the following explanations regarding the first to tenth exemplary embodiments, the same reference numbers and characters are assigned to the same components for brevity.

First Exemplary Embodiment

A description will be given of an engine control device according to a first exemplary embodiment and a vehicle 1 on which the engine control device is mounted with reference to FIG. 1 to FIG. 6.

FIG. 1 is a schematic view showing the engine control device 10 according to the first exemplary embodiment and the vehicle 1 equipped with the engine control device 10. As shown in FIG. 1, the engine control device 10 according to the first exemplary embodiment is applied to the vehicle 1. The vehicle 1 has an internal combustion engine (hereinafter, the engine 2), a battery 5, and the engine control device 10 according to the first exemplary embodiment.

The engine 2 is a four cylinder gasoline engine using gasoline fuel, for example. The engine 2 provides an output torque through its driving shaft 3. Wheels (omitted from drawings) of the vehicle 1 are driven by the output torque of the engine 2 transmitted through the driving shaft 3, and the vehicle moves forward or backward. A ring gear 4 is fixed to the driving shaft 3 of the engine 2, and the ring gear 4 and the driving shaft 3 rotate simultaneously. The battery 5 is a lead battery, for example, and supplies electric power to various types of devices mounted on the vehicle.

The engine control device 10 is equipped with a push starter 21, inhibitor switch 23, a starter 30, a relay 40, a relay 41, a high voltage side driver 51, an idle stop ECU 70, an engine ECU 80, etc.

The engine control device 10 controls the operation of the engine 2 on the basis of one or more detection signals transmitted from various types of sensors mounted on various sections of the vehicle 1. In particular, the engine control device 10 according to the first exemplary embodiment has an idle stop function which is capable of executing an automatic engine stop process when a predetermined engine stop condition is satisfied. When the engine control device 10 executes the automatic engine stop process, the engine automatically stops.

A high-voltage side terminal +BB of the battery 5 is connected to the push starter 21, the relay 40, the idle stop ECU 70, and the engine ECU 80.

Each of the idle stop ECU 70 and the engine ECU 80 is a microcomputer or a processor having a central processing unit (CPU), a read only memory (ROM), a random access memory (RAM), an input/output interface (I/O interface), etc. Each of the idle stop ECU 70 and the engine ECU 80 receives detection signals transmitted from the various sensors mounted on the vehicle 1 and executes one or more programs stored in a non-transitory computer readable storage medium such as semiconductor memories, for example, the ROM or RAM to perform various calculations on the basis of the received detection signals. Each of the idle stop ECU 70 and the engine ECU 80 executes a control process capable of controlling the operation of the engine 2 of the vehicle 1 on the basis of the calculation results.

In the structure of the first exemplary embodiment shown in FIG. 1, the idle stop ECU 70 is stored in a casing 61. The idle stop ECU 70 has an input section 601 and an output section 611, etc. The engine ECU 80 is stored in a casing 62. The casing 61 and the casing 62 correspond to a first casing and a second casing, respectively.

The idle stop ECU 70 is connected to the engine ECU 80 through signal lines 65 through which various signals based on the controller area network (CAN) standard are transmitted between the idle stop ECU 70 and the engine ECU 80.

The relay 40 is a mechanical relay having a coil and a movable contact, for example. When the driver of the vehicle 1 turns on an ignition switch of the vehicle 1, an ignition voltage is generated and supplied to the engine ECU 80. The engine ECU 80 supplies electric power to the coil of the relay 40. When receiving electric power, the movable contact of the relay 40 is turned on (set to a connected state). This state allows the battery 5 to supply electric power through the high voltage side terminal +BB of the battery 5 to a high voltage side terminal +B of the engine control device 10.

The push starter 21 has a button 22. One side of the push starter 21 is connected to the high voltage side terminal +B of the engine control device 10, and the other side of the push starter 21 is connected to the input section 601 of the idle stop ECU 70.

The inhibitor switch 23 is arranged between the push starter 21 and the idle stop ECU 70. The inhibitor switch 23 enters a turned-on state only when a predetermined condition is satisfied, i.e. for example, only when a selector lever of the vehicle 1 is at the P position or the N position. In this case, i.e. when the predetermined condition is satisfied, the inhibitor switch 23 allows the push starter 21 and the idle stop ECU 70 to communicate with each other, and signals are transmitted between the push starter 21 and the idle stop ECU 70.

The inhibitor switch 23 becomes in the turned-on state when the selector lever of the vehicle is at positions (for example, D position) other than the P position and the N position. In this case, the inhibitor switch 23 allows data transmission between the push starter 21 and the idle stop ECU 70.

The push starter 21 corresponds to an initial start intention detection section capable of detecting the driver's intention to start the engine 1.

The inhibitor switch 23 corresponds to a signal transmission permission section.

When the vehicle 1 stops, the selector lever is at the P position and the driver of the vehicle 1 pushes the button 22 of the push starter 21, the battery voltage (for example, 12 volts) is supplied from the high voltage side terminal +B of the engine control device 10 to the input section 601 of the idle stop ECU 70 through the push starter 21 and the inhibitor switch 23.

That is, the push starter 21 detects the driver's intention of performing the initial start process of the engine 2, generates an initial start signal corresponding to the driver's intention, and transmits the generated initial start signal to the idle stop ECU 70.

Figure 2:
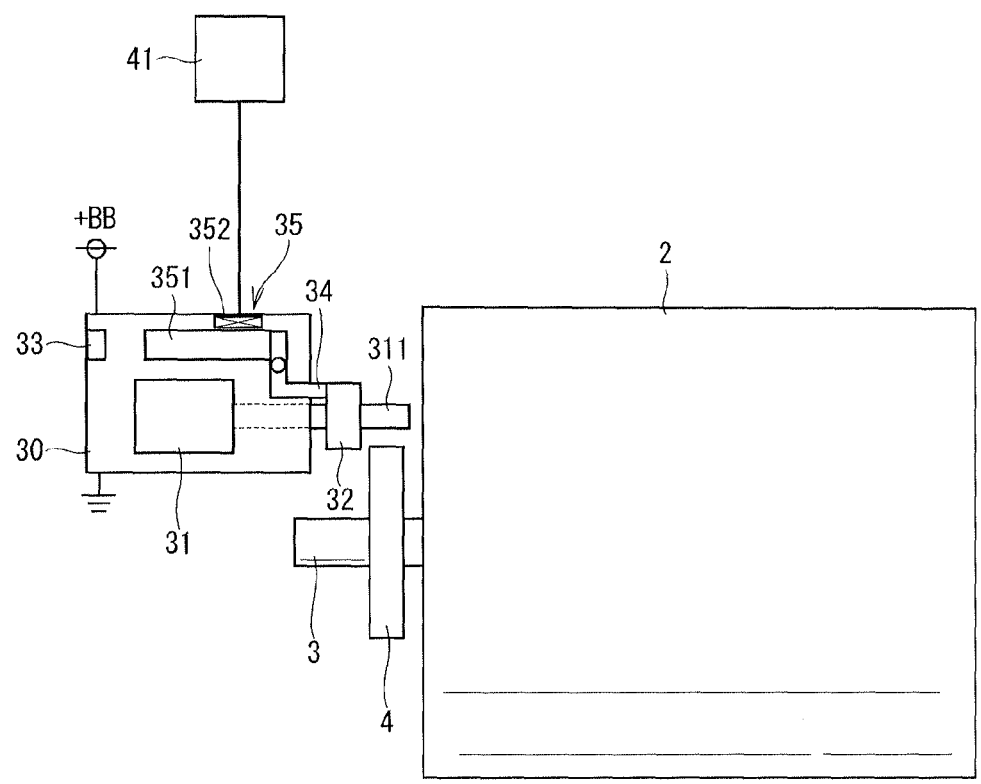
FIG. 2 is a view showing a starter as an engine start device and an internal combustion engine which are target devices to be controlled by the engine control device according to the first exemplary embodiment shown in FIG. 1.

FIG. 2 is a view showing the starter 30 as the engine start device and the engine 2 which are target devices to be controlled by the engine control device 10 according to the first exemplary embodiment shown in FIG. 1.

As shown in FIG. 2, the starter 30 has a motor 31, a pinion gear 32, a power supply unit 33, a pushing member 34, a solenoid 35, etc. The starter 30 is arranged near the ring gear 4 of the engine 2.

The motor 31 is a motor with a brush, for example. That is, the motor 31 has a brush and a motor shaft 311. When receiving electric power, the motor 31 provides an output torque through the motor shaft 311. The pinion gear 32 is fixed to the motor shaft 311. The assembly of the pinion gear 32 and the motor shaft 311 rotates, and the pinion gear 32 is a movable member, i.e. moves along the axial direction of the motor shaft 311.

The power supply unit 33 is connected to the high voltage side terminal +BB of the battery 5, and receives a battery voltage of the battery 5. The pushing member 34 pushes the pinion gear 32 which is at the power supplying unit 33 side.

The solenoid 35 has a core 351, and a coil 352. The core 351 is arranged in contact with the pushing member 34 at the power supplying unit 33 side. When receiving electric power, the coil 352 moves toward the power supplying unit 33 side.

When the core 351 has moved to the power supplying unit 33 side, the pushing member 34 starts rotating, the pinion gear 32 is pushed to the ring gear 4, and the pinion gear 32 engages with the ring gear 4.

When the core 351 further moves to the power supplying unit 33 side, and is in contact with the power supplying unit 33. When the core 351 has been in contact with the power supplying unit 33, the power supplying unit 33 supplies the electric power to the motor 31. When receiving electric power, the motor 31 supplies the output torque through the motor shaft 311 to the pinion gear 32. Accordingly, the pinion gear 32 and the ring gear 4 are rotating simultaneously. The driving shaft 3 starts to rotate. At this timing, the engine ECU 80 instructs fuel injection valves (not shown) to supply fuel to the cylinders of the engine 2. The engine 2 thereby starts to operate. The starter 30 corresponds to the engine start device.

Similar to the relay 41 previously explained, the relay 41 is a mechanical relay and is connected to the coil 352 of the solenoid 35 in the starter 30, as shown in FIG. 2.

The high voltage side driver 51 is arranged at the high voltage side when compared in position with the relay 41. For example, the high voltage side driver 51 is a p-MOS switching element.

The source of the high voltage side driver 51 is connected to the high voltage side terminal +B of the push starter 21, the drain of the high voltage side driver 51 is connected to one terminal of a coil in the relay 41, and the gate of the high voltage side driver 51 is connected to an output section 611 of the idle stop ECU 70.

The other terminal of the coil in the relay 41 is grounded, which is opposite to the one terminal of the coil in the relay 41 connected to the high voltage side terminal +B of the push starter 21.

When receiving a turning-on instruction signal transmitted from the output section 611, the high voltage side driver 51 is turned on, and a current flows from the high voltage side terminal +B of the push starter 21 to the ground through the high voltage side driver 51 and the relay 41. That is, the relay 41 receives electric power.

When receiving electric power, the relay 41 allows the current to flow between the solenoid 35 and the high voltage side terminal +B of the push starter 21. The core 351 thereby moves to the power supplying unit 33 side, the pinion gear 32 is engaged with the ring gear 4, the motor 31 starts to rotate and the driving shaft 3 starts to rotate. As a result, the engine 2 starts.

The turning-on instruction signal, which is generated by the idle stop ECU 70 and transmitted to the high voltage side driver 51 through the output section 611, will be referred to as the "start signal".

The engine ECU 80 receives detection signals transmitted from an accelerator sensor and a brake sensor for the accelerator pedal 6 and the brake pedal 7.

When the driver of the vehicle depresses the accelerator pedal 6, the accelerator sensor generates a detection signal corresponding to the depressed depth of the accelerator pedal 6, and transmits the detection signal to the engine ECU 80.

When receiving the detection signal transmitted from the accelerator sensor of the accelerator pedal 6, the engine ECU 80 detects whether or not the driver of the vehicle has depressed the accelerator pedal 6, and detects the depressed depth of the accelerator pedal 6 on the basis of the received detection signal.

The engine ECU 80 controls the operation of the engine 2, i.e. adjusts an opening ratio of a throttle valve (not shown), an injection amount of a fuel to be injected from the fuel injection valves into the inside of the cylinders of the engine 2, etc. on the basis of the depressed depth of the accelerator pedal, etc.

When the depressed depth of the accelerator pedal becomes large, the vehicle 1 accelerates.

When the driver of the vehicle 1 depresses the brake pedal 7, the brake sensor detects the depressed depth of the brake pedal 7, and transmits a detection signal, which corresponds to the detected depressed depth of the brake pedal 7, to the engine ECU 80.

When receiving the detection signal transmitted from the brake sensor of the brake pedal 7, the engine ECU 80 detects whether or not the driver of the vehicle has depressed the brake pedal 7 (ON or OFF), and detects the depressed depth of the brake pedal 7 on the basis of the received detection signal.

When the driver of the vehicle 1 depresses the brake pedal 7, pads (not shown) are pushed to the wheels of the vehicle 1, and the rotation speed of the wheels of the vehicle is reduced. Thereby, the vehicle 1 decelerates.

A crank angle sensor 8 is mounted on the engine 2. The crank angle sensor 8 detects a rotation angle of the ring gear 4, and generates a detection signal which corresponds to the detected crank angle, and transmits the detection signal to the engine ECU 80.

When receiving the detection signal of the crank angle sensor 8, the engine ECU 80 detects the rotation speed of the driving shaft 3, i.e. the rotation speed of the engine 2 on the basis of the received detection signal transmitted from the crank angle sensor 8.

The speed sensor 9 is arranged near the wheels of the vehicle 1. The speed sensor 9 generates a detection signal which corresponds to a rotation speed of the wheels of the vehicle 1, and transmits the detection signal to the engine ECU 80.

When receiving the detection signal transmitted from the speed sensor 9, the engine ECU 80 detects a speed of the vehicle 1 on the basis of the received detection signal.

The idle stop ECU 70 is a computer system having a microcomputer which is configured to provide an automatic engine stop control section 71, an engine start control section 72, an engine restart finish detection section 73, and an automatic engine stop permission section 74.

The engine ECU 80 is a computer system having a microcomputer which is configured to provide a vehicle state detection section 81 and a continuous rotation detection section 82.

Continuous operation indicates that the continuous rotation of the engine 2 is maintained only by using energy generated by the fuel combustion.

The vehicle state detection section 81 receives a detection signal transmitted from the speed sensor 9 of the vehicle 1, and detects various vehicle states on the basis of the received detection signal transmitted from the speed sensor 9. That is, the vehicle states includes an acceleration state, an inertia travelling state, a decelerating state and a stopped state.

The vehicle state detection section 81 generates a detection signal, which corresponds to the detection state, to the automatic engine stop control section 71 of the idle stop ECU 70.

The continuous rotation detection section 82 detects whether or not the engine 2 is in the continuous operation state in which the engine 2 is continuously rotating on the basis of the detection signal transmitted from the crank angle sensor 8.

Specifically, the continuous rotation detection section 82 judges that the engine 2 is now in the continuous operation state on the basis of the detection signal transmitted from the crank angle sensor 8 when the rotation speed of the engine 2 exceeds a predetermined rotation speed. When the engine 2 is now in the continuous operation state, the continuous rotation detection section 82 generates a control signal, which represents the judgment result, to the engine restart finish detection section 73 in the idle stop ECU 70 through the signal lines 65.

The automatic engine stop control section 71 can instruct the engine 2 to automatically stop when the vehicle state detection section 81 detects that the vehicle 1 is in one of the inertia travelling state, the decelerating state, and the stopped state, and the automatic engine stop control section 71 detects that the automatic engine stop condition is satisfied.

The inertia travelling state represents that the vehicle 1 is running approximately at a constant speed due to the inertial motion of the vehicle 1, i.e. the vehicle 1 is coasting on a roadway (coasting drive state).

The decelerating state represents a state in which the speed of the vehicle 1 gradually reduces. The stopped state represents the vehicle 1 is stationary, i.e. the speed of the vehicle 1 is zero.

For example, the automatic engine stop control section 71 detects that the automatic engine stop condition is satisfied only when the vehicle state detection section 81 in the engine ECU 80 detects that the vehicle 1 is in the inertia travelling state and the engine ECU 80 detects that the speed of the vehicle 1 is not less than 50 km/h and the driver of the vehicle 1 releases the acceleration pedal 8 (i.e. the detection signal of the accelerator pedal 8 is OFF, i.e. L level)

The automatic engine stop control section 71 generates and transmits a control signal, which represents that the automatic engine stop condition has been satisfied, to the engine ECU 80 through the signal lines 65.

When receiving the control signal transmitted from the automatic engine stop control section 71 in the idle stop ECU 70, the engine ECU 80 instructs the fuel injection valves to stop the fuel injection on the basis of the received control signal. The engine 2 automatically stops operating. At this time, the engine ECU 80 disconnects the engine 2 from the transmission assembly. This control process makes it possible to reduce a rotation resistance of the engine 2 while the vehicle 1 is running in the inertia travelling state, and to improve the fuel consumption reduction of the vehicle 1.

Further, the automatic engine stop control section 71 detects that the automatic engine stop condition is satisfied only when the vehicle state detection section 81 detects that the vehicle 1 is in the decelerating state and the engine ECU 80 detects that the speed of the vehicle 1 is not more than 10 km/h and the driver of the vehicle 1 depresses the brake pedal 7 (i.e. the detection signal of the brake pedal 7 is ON, H level).

The automatic engine stop control section 71 generates and transmits the control signal, which represents that the automatic engine stop condition has been satisfied, to the engine ECU 80 through the signal lines 65.

When receiving the control signal transmitted from the automatic engine stop control section 71 in the idle stop ECU 70, the engine ECU 80 instructs the fuel injection valves to stop the fuel injection on the basis of the received control signal. The engine 2 automatically stops operating.

When receiving an initial start intention signal transmitted from the push starter 21 and the automatic engine start condition is satisfied, the engine start control section 72 supplies electric power to the starter 30 so as to drive the starter 30 and start the engine 2 to operate.

For example, when the driver of the vehicle 1 pushes the button 22 so as to start the operation of the engine 2 under the state in which the selector lever is in the P position and the vehicle 1 has been stopped, the push starter 21 generates and transmits the initial start intention signal of a high level (ON, H level) to the engine start control section 72 in the idle stop ECU 70.

When receiving the initial start intention signal of a high level (ON, H level) transmitted from the push starter 21, the engine start control section 72 generates, and transmits an engine start signal of a high level (ON, H level) to the output section 611 of the casing 61, and finally reach the high voltage side driver 51. The high voltage side driver 51 is thereby turned on, and the electric power is supplied from the high voltage side terminal +B of the engine control device 10 to the starter 30. The starter 30 starts to operate and drives the engine 2 to start. This process is an initial engine start process.

As previously described, when receiving the initial start intention signal (ON) transmitted from the push starter 21, the engine start control section 72 allows the supply of the electric power to the starter 30 so as to drive the starter 30, and to automatically restart the engine 2.

Further, the engine start control section 72 detects that the automatic engine stop condition is satisfied when the driver of the vehicle depresses the accelerator pedal 6 (from OFF to ON) or the driver of the vehicle 1 releases the brake pedal 7 (from ON to OFF) under a state in which the vehicle 1 is running after the engine 2 has been automatically stopped by the automatic engine stop control section 71 during the inertia travelling state or the decelerating state of the vehicle 1. The engine start control section 72 generates and transmits the engine start signal to the high voltage side driver 51 through the output section 611 of the casing 61. The starter 30 thereby drives the engine 2 to start so as to execute the automatic engine start of the engine 2.

Still further, the engine start control section 72 detects that the automatic engine stop condition is satisfied when the driver of the vehicle releases the brake pedal 7 (from ON to OFF) under a state in which the vehicle 1 has stopped after the engine 2 has been automatically stopped by the automatic engine stop control section 71 during one of the inertia travelling state, the decelerating state and the stopped state of the vehicle 1. The engine start control section 72 generates and transmits the engine start signal to the high voltage side driver 51 through the output section 611 of the casing 61. The starter 30 thereby drives the engine 2 to start. This starts the automatic engine start of the engine 2.

As previously explained, when the automatic engine restart condition has been satisfied, the engine start control section 72 allows the supply of the electric power to the starter 30 so as to drive the starter 30, and to automatically restart the engine 2.

The engine restart finish detection section 73 can detect whether or not the engine start or the engine restart has been completed. As previously described, when detecting that the rotation speed of the engine 2 has exceeded the predetermined rotation speed and engine 2 has been in the continuous operation, the continuous rotation detection section 82 generates and transmits a detection signal, which corresponds to the detection result, to the engine restart finish detection section 73 in the idle stop ECU 70 through the signal lines 65.

When receiving the detection signal transmitted from the continuous rotation detection section 82, the engine restart finish detection section 73 judges whether or not the engine start has been completed on the basis of the received detection signal.

That is, when the continuous rotation detection section 82 has judged that the engine 2 is continuously operating, the engine restart finish detection section 73 judges that the engine start has been completed, i.e. the fuel combustion of the engine 2 is continuing normally.

The automatic engine stop permission section 74 allows the automatic engine stop control section 71 to stop the operation of the engine 2 when the engine restart finish detection section 73 has judged that the engine start has been completed when the engine start control section 72 has received the initial engine start intention signal transmitted from the push starter 21 so as to restart the operation of the engine 2.

On the other hand, the automatic engine stop permission section 74 inhibits the automatic engine stop control section 71 from stopping the operation of the engine 2 when the engine restart finish detection section 73 has judged that the engine start has not been completed when the engine start control section 72 has received the initial engine start intention signal transmitted from the push starter 21 so as to restart the operation of the engine 2.

Those control processes make it possible to prevent the occurrence of a case in which an incorrect engine restart has occurred after an engine stop executed by the automatic engine stop control section 71 due to incorrect operation of the engine start control section 72.

The engine start control section 72 stops outputting the engine start signal of a high level (ON, H level) to the high voltage side driver 51, so as to stop the supply of electric power to the starter 30, when the engine restart finish detection section 73 has judged the completion of the engine start. This control process makes it possible to stop the starter 30 consuming electric power after the engine 2 has reached the stable combustion.

A description will now be given of the engine control process executed by the engine control device 10 according to the first exemplary embodiment with reference to FIG. 3.

Figure 3:
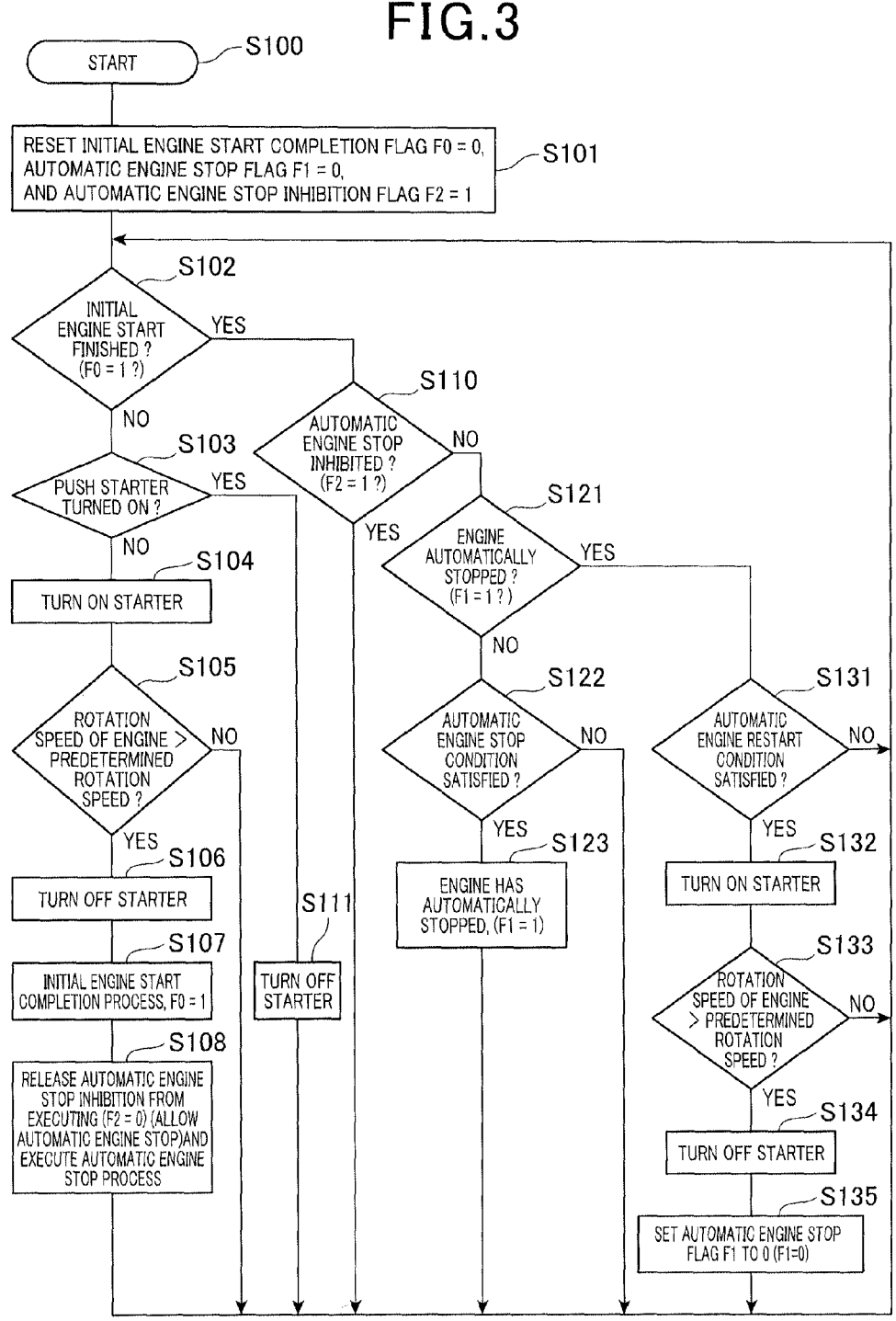
FIG. 3 is a view showing a flow chart of an engine control process executed by the engine control device according to the first exemplary embodiment shown in FIG. 1.

FIG. 3 is a view showing a flow chart of the engine control process executed by the engine control device 10 according to the first exemplary embodiment shown in FIG. 1 which controls the operation of the internal combustion engine 2.

The engine control device 10 executes the engine control process S100 shown in FIG. 3. The engine control device 10 executes the engine control process S100 shown in FIG. 3 so as to control the operation of the engine 2 of the vehicle 1. When receiving the ignition voltage, the engine ECU 80 and the idle stop ECU 70 are activated, and start to operate.

In step S101, the idle stop ECU 70 performs the reset of various flags. Specifically, the idle stop ECU 70 sets an initial engine start completion flag F0 to zero (F0=0). The initial engine start completion flag F0 represents whether or not the initial engine start of the engine 2 has been finished. The initial engine start completion flag F0 of zero (F0=0) indicates that the initial engine start is not finished. On the other hand, the initial engine start completion flag F0 of 1 (F0=1) indicates that the initial engine start has been finished.

Further, in step S101, the idle stop ECU 70 sets an automatic engine stop flag F1 to zero (F1=0). The automatic engine stop flag F1 represents whether or not the engine 2 has automatically stopped by the automatic engine stop control section 71.

The automatic engine stop flag F1 of 0 (F1=0) indicates that the engine 2 is not being stopped by the automatic engine stop control section 71. On the other hand, the automatic engine stop flag F1 of 1 (F1=1) indicates that the engine 2 has been stopped by the automatic engine stop control section 71.

Still further, in step S101, the idle stop ECU 70 sets an automatic engine stop inhibition flag F2 to 1 (F2=1). The automatic engine stop inhibition flag F2 represents whether or not the automatic engine stop by the automatic engine stop control section 71 is permitted.

The automatic engine stop inhibition flag F2 of 0 (F2=0) indicates that it is permitted for the automatic engine stop control section 71 to execute the automatic engine stop. On the other hand, the automatic engine stop inhibition flag F2 of 1 (F2=1) indicates that it is inhibited for the automatic engine stop control section 71 is inhibited from executing the automatic engine stop. The operation flow progresses to step S102.

In step S102, the idle stop ECU 70 detects whether the initial start of the engine 2 has been finished. Specifically, the idle stop ECU 70 detects whether the initial start of the engine 2 has been finished on the basis of the value of the initial engine start completion flag F0.

When the detection result in step S102 indicates negation ("NO" in step S102), i.e. indicates that the initial start of the engine 2 is not finished as indicated by the initial engine start completion flag F0 of zero (F0=0), the operation flow progresses to step S103.

On the other hand, when the detection result in step S102 indicates affirmation ("YES" in step S102), i.e. indicates that the initial start of the engine 2 has been finished as indicated by the initial engine start completion flag F0 of 1 (F0=1), the operation flow progresses to step S110.

In step S103, the idle stop ECU 70 detects whether the driver of the vehicle 1 has pushed the button 22 in the push starter 21, and the push starter 21 as a start switch (start SW) has been turned on. Specifically, the idle stop ECU 70 detects whether the engine start control section 72 has received the initial engine start intention signal transmitted from the push starter 21.

When the detection result in step S103 indicates affirmation ("YES" in step S103), i.e. indicates that the engine start control section 72 has received the initial engine start intention signal transmitted from the push starter 21, the operation flow progresses to step S104.

On the other hand, when the detection result in step S103 indicates negation ("NO" in step S103), i.e. indicates that the engine start control section 72 has not received the initial engine start intention signal, the operation flow progresses to step S111.

In step S104, the idle stop ECU 70 turns on the starter 30. Specifically, the engine start control section 72 outputs the engine start signal of a high level (ON, H level) to the high voltage side driver 51 through the output section 611 so as to drive the starter 30. The operation flow progresses to step S105.

In step S105, the idle stop ECU 70 detects whether the rotation speed of the engine 2 exceeds the predetermined rotation speed at the complete combustion of the engine 2. Specifically, the idle stop ECU 70 detects whether the rotation speed of the engine 2 has exceeded the predetermined rotation speed on the basis of the control signal transmitted from the continuous rotation detection section 82 in the engine ECU 80.

When the detection result in step S105 indicates affirmation ("YES" in step S105), i.e. indicates that the rotation speed of the engine 2 has exceeded the predetermined rotation speed, the operation flow progresses to step S106.

On the other hand, when the detection result in step S105 indicates negation ("NO" in step S105), i.e. indicates that the rotation speed of the engine 2 has not reached the predetermined rotation speed, the operation flow returns to step S102.

In step S106, the idle stop ECU 70 turns off the starter 30. Specifically, the engine start control section 72 outputs the engine start signal of a low level (OFF, L level) to the high voltage side driver 51 through the output section 611 so as to stop the starter 30 operating. The operation flow progresses to step S107.

In step S107, the idle stop ECU 70 sets the initial engine start completion flag F0 to 1 (F0=1) which represents that the initial engine start of the engine 2 has been finished. The operation flow progresses to step S108.

In step S108, the idle stop ECU 70 sets the automatic engine stop inhibition flag F2 to 0 (F2=0) which represents that the automatic engine stop by the automatic engine stop control section 71 is permitted, i.e. allowed. The operation flow returns to step S102.

In step S110, the idle stop ECU 70 detects whether the automatic engine stop by the automatic engine stop control section 71 is permitted. Specifically, the idle stop ECU 70 detects it on the basis of the value of the automatic engine stop inhibition flag F2.

When the detection result in step S110 indicates affirmation ("YES" in step S110), i.e. indicates that the automatic engine stop inhibition flag F2 is 1 (F2=1) and the automatic engine stop control section 71 is inhibited from executing the automatic engine stop, the operation flow returns to step S102.

On the other hand, when the detection result in step S110 indicates negation ("NO" in step S110), i.e. indicates that the automatic engine stop inhibition flag F2 is 0 (F2=0) and the automatic engine stop control section 71 is permitted to execute the automatic engine stop, the operation flow returns to step S121.

In step S111, the idle stop ECU 70 turns off the starter 30. Specifically, the engine start control section 72 outputs the engine start signal of a low level (OFF, L level) to the high voltage side driver 51 through the output section 611 so as to stop the starter 30 operating. The operation flow returns to step S102.

In step S121, the idle stop ECU 70 detects whether the engine 2 has been automatically stopped by the automatic engine stop control section 71. Specifically, the idle stop ECU 70 detects whether the engine 2 has been automatically stopped on the basis of the automatic engine stop flag F1.

When the detection result in step S121 indicates negation ("NO" in step S121), i.e. indicates that the automatic engine stop flag F1 is 0 (F1=0) and the engine 2 is not automatically stopping due to the automatic engine stop control section 71, the operation flow progresses to step S122.

On the other hand, when the detection result in step S121 indicates affirmation ("YES" in step S121), i.e. indicates that the automatic engine stop flag F1 is 1 (F1=1) and the engine 2 has been automatically stopped by the automatic engine stop control section 71, the operation flow progresses to step S131.

In step S122, the automatic engine stop control section 71 in the idle stop ECU 70 detects whether the automatic engine stop condition has been satisfied. When the detection result in step S122 indicates affirmation ("YES" in step S122), i.e. indicates that the automatic engine stop condition has been satisfied, the operation flow progresses to step S123. In this case, the automatic engine stop control section 71 instructs the engine ECU 80 to execute the automatic engine stop of the engine 2.

On the other hand, when the detection result in step S122 indicates negation ("NO" in step S122), i.e. indicates that the automatic engine stop condition is not satisfied, the operation flow returns to step S102.

In step S123, the idle stop ECU 70 sets the automatic engine stop flag F1 to 1 (F1=1) which indicates that the engine 2 has been stopped by the automatic engine stop control section 71. The operation flow returns to step S102.

In step S131, the engine start control section 72 in the idle stop ECU 70 detects whether the automatic engine restart condition is satisfied.

When the detection result in step S131 indicates affirmation ("YES" in step S131), i.e. indicates that the automatic engine stop condition has been satisfied, the operation flow progresses to step S132.

On the other hand, when the detection result in step S131 indicates negation ("NO" in step S131), i.e. indicates that the automatic engine stop condition is not satisfied, the operation flow returns to step S102.

In step S132, the idle stop ECU 70 turns on the starter 30. Specifically, the engine start control section 72 outputs the engine start signal of a high level (ON, H level) to the high voltage side driver 51 through the output section 611 so as to drive the starter 30. The operation flow progresses to step S133.

In step S133, the idle stop ECU 70 detects whether the rotation speed of the engine 2 exceeds the predetermined rotation speed at the complete combustion of the engine 2.

Specifically, the idle stop ECU 70 detects whether the rotation speed of the engine 2 has exceeded the predetermined rotation speed on the basis of the control signal transmitted from the continuous rotation detection section 82 in the engine ECU 80.

When the detection result in step S133 indicates affirmation ("YES" in step S133), i.e. indicates that the rotation speed of the engine 2 has exceeded the predetermined rotation speed, the operation flow progresses to step S134.

On the other hand, when the detection result in step S133 indicates negation ("NO" in step S133), i.e. indicates that the rotation speed of the engine 2 has not reached the predetermined rotation speed, the operation flow returns to step S102.

In step S134, the idle stop ECU 70 turns off the starter 30. Specifically, the engine start control section 72 outputs the engine start signal of a low level (OFF, L level) to the high voltage side driver 51 through the output section 611 so as to stop the starter 30 operating. The operation flow progresses to step S135.

In step S135, the idle stop ECU 70 sets the automatic engine stop flag F1 to 0 (F1=0) which indicates that the engine 2 does not stop by the automatic engine stop control section 71. The operation flow returns to step S102.

As previously explained in detail, the engine control process S100 shown in FIG. 3 is continuously executed when the engine ECU 80 and the idle stop ECU 70 start to operate until the operation of the engine ECU 80 and the idle stop ECU 70 is stopped.

A description will now be given of the control process of the engine 2 under the control of the engine control device 10 according to the first exemplary embodiment with reference to FIG. 4, FIG. 5 and FIG. 6.

(First Operation of the Engine 2)

Figure 4:
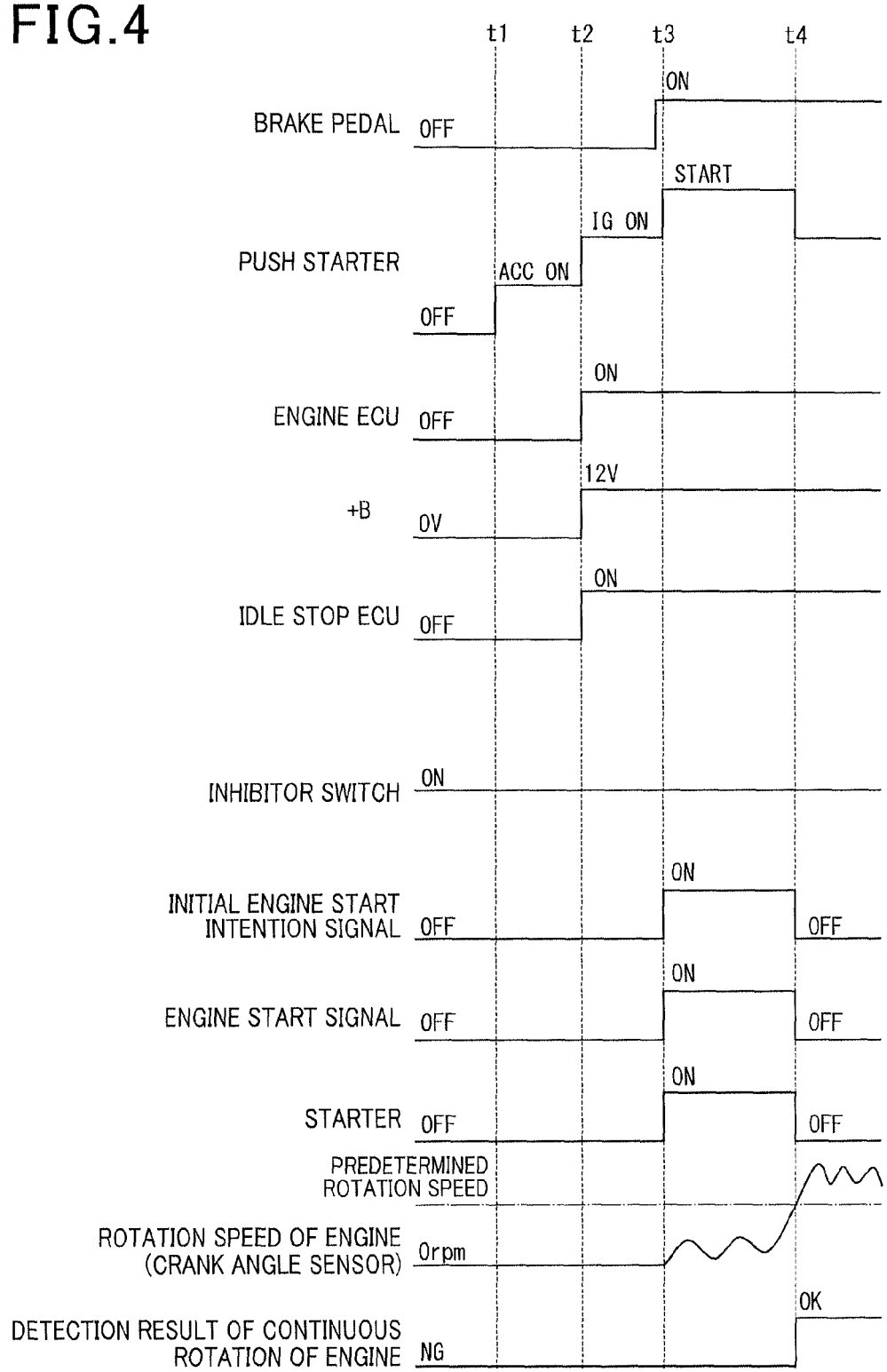
FIG. 4 is view showing a timing chart of a first operation of the internal combustion engine which is controlled by the engine control device according to the first exemplary embodiment shown in FIG. 1.

FIG. 4 is view showing a timing chart of a first operation of the engine 2 which is controlled by the engine control device 10 according to the first exemplary embodiment shown in FIG. 1.

At the timing t1 shown in FIG. 4, the driver of the vehicle 1 pushes the button 22, the ignition power source is turned on and provides electric power to the engine ECU 80 and the idle stop ECU 70.

When receiving electric power, the engine ECU 80 and the idle stop ECU 70 start to operate, and the battery 5 supplies electric power through the high voltage side terminal +BB to the high voltage side terminal +B of the engine control device 10.

The driver of the vehicle 1 depresses the brake pedal 7 (from OFF to ON) before the timing t3, and when the driver of the vehicle 1 pushes the button 22 of the push starter 21 at the timing t3, the push starter 21 transmits the initial start intention signal of a high level (ON, H level) to the engine start control section 72. When receiving the initial start intention signal of a high level (ON, H level), the engine restart control section 72 generates and transmits the engine start signal of a high level (ON, H level) to the high voltage side driver 51. When receiving the engine start signal of a high level (ON, H level), the high voltage side driver 51 is turned on, and the electric power is supplied to the starter 30, and the starter 30 starts to operate (turned-on state of the starter 30), and drives the engine 2 to start.

When the rotation speed of the engine 2 increases and exceeds the predetermined rotation speed at the timing t4, the continuous rotation detection section 82 detects that the engine 2 has been in continuous operation (OK, see FIG. 4). Accordingly, the engine restart finish detection section 73 detects that the start process of the engine 2 has been finished. When the engine restart finish detection section 73 detects that that the start process of the engine 2 has been finished, the transmission of the initial start intention signal of a high level (ON, H level) to the idle stop ECU 70 is halted, i.e. the initial start intention signal is switched from the high level to the low level (OFF, L level), and the engine start signal of a high level (ON, H level) to the high voltage side driver 51 is halted, i.e. the engine start signal is switched from the high level to the low level (OFF, L level). This stops the starter 30 from operating.

(Second Operation of the Engine 2)

Figure 5:
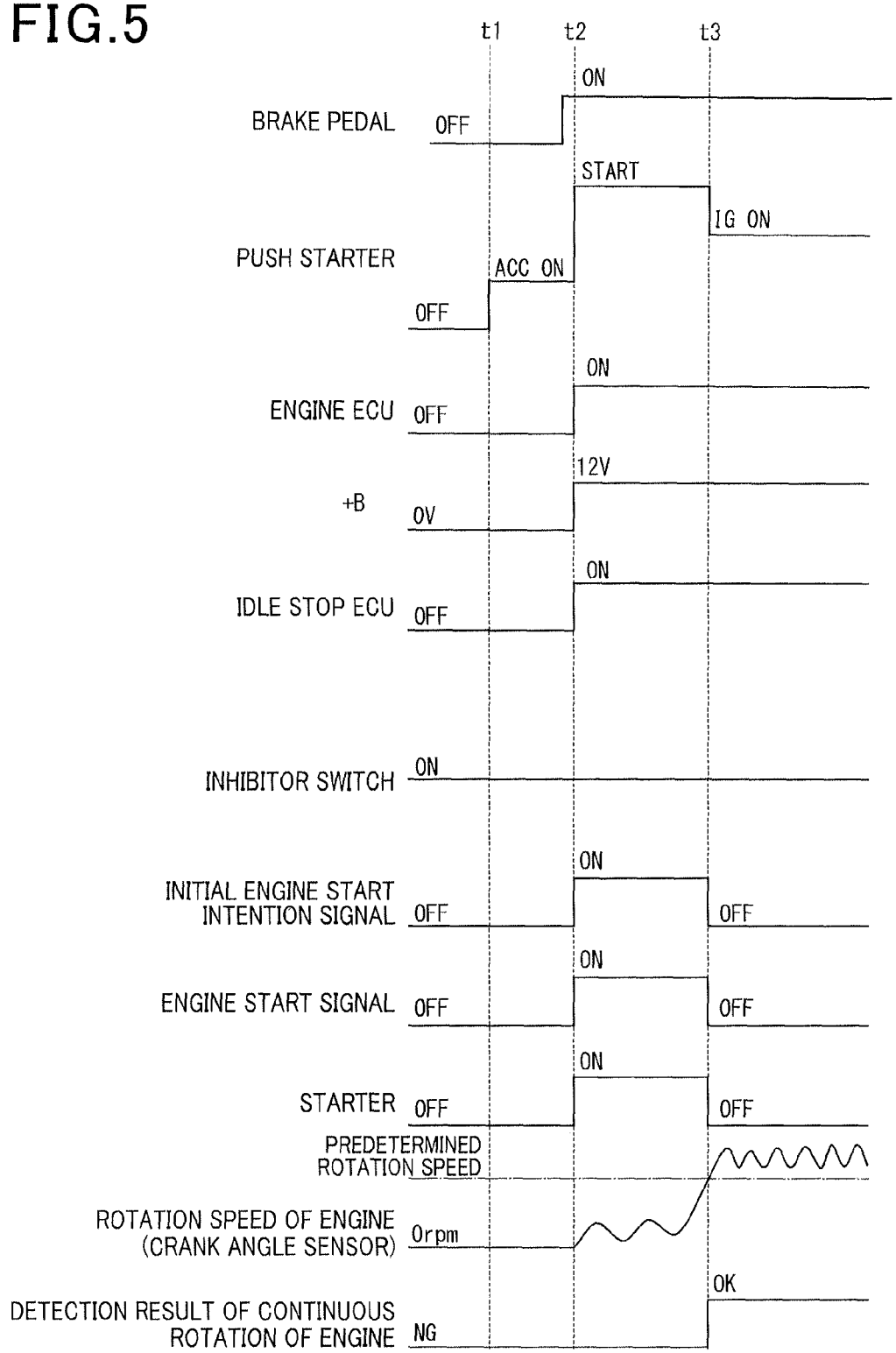
FIG. 5 is view showing a timing chart of a second operation of the internal combustion engine which is controlled by the engine control device according to the first exemplary embodiment shown in FIG. 1.

FIG. 5 is view showing a timing chart of a second operation of the engine 2 which is controlled by the engine control device 10 according to the first exemplary embodiment shown in FIG. 1.

At the timing t1 shown in FIG. 5, when the driver of the vehicle 2 pushes the button 22 of the push starter 21, an accessory power source is turned on.

The driver of the vehicle 1 depresses the brake pedal 7 (from OFF to ON) before the timing t2, and when the driver of the vehicle 1 pushes the button 22 of the push starter 21 at the timing t2, the ignition power source is turned on. When receiving electric power, the engine ECU 80 and the idle stop ECU 70 start to operate, and the battery 5 supplies electric power through the high voltage side terminal +BB to the high voltage side terminal +B of the engine control device 10. Further, the push starter 21 transmits the initial start intention signal of a high level (ON, H level) to the engine start control section 72. When receiving the initial start intention signal of a high level (ON, H level), the engine start control section 72 transmits the engine start signal of a high level (ON, H level) to the high voltage side driver 51. As a result, the high voltage side driver 51 is turned on, and the electric power is supplied to the starter 30 from the high voltage side terminal +B of the engine control device 10, and the starter 30 starts to operate so as to drive the engine 2 to start.

When the rotation speed of the engine 2 increases and exceeds the predetermined rotation speed at the timing t3, the continuous rotation detection section 82 detects that the engine 2 is in the continuous operation state. Accordingly, the engine restart finish detection section 73 detects that the start process of the engine 2 has been finished. When the engine restart finish detection section 73 detects that that the start process of the engine 2 has been finished, the transmission of the initial start intention signal of a high level (ON, H level) to the idle stop ECU 70 is halted, i.e. the initial start intention signal is switched from the high level to the low level (OFF, L level), and the engine start signal of a high level (ON, H level) to the high voltage side driver 51 is also halted, i.e. the engine start signal is switched from the high level to the low level (OFF, L level). Thereby, the starter 30 stops from driving the engine 2.

(Third Operation of the Engine 2)

Figure 6:
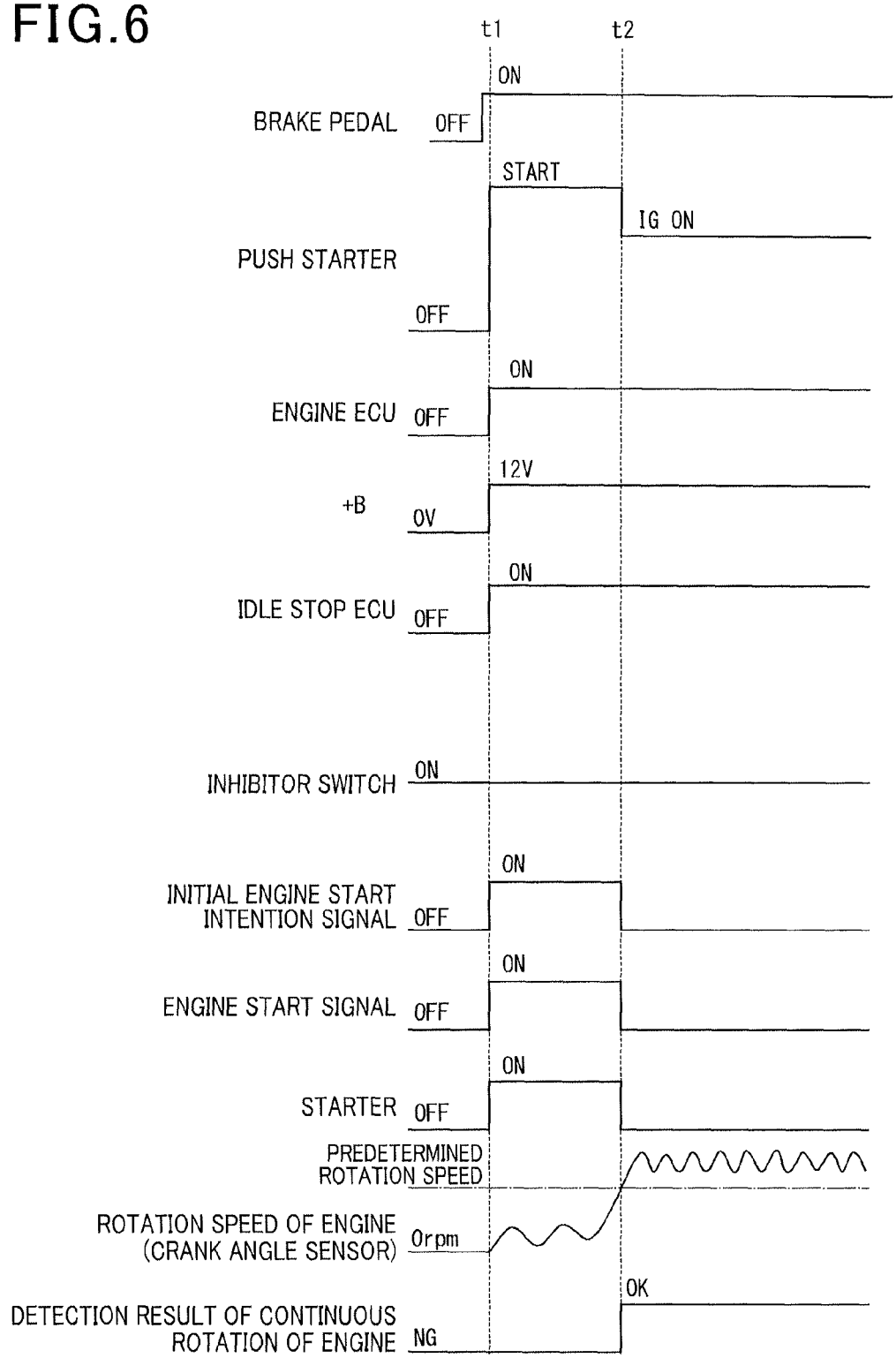
FIG. 6 is view showing a timing chart of a third operation of the internal combustion engine which is controlled by the engine control device according to the first exemplary embodiment shown in FIG. 1.

FIG. 6 is view showing a timing chart of the third operation of the engine 2 which is controlled by the engine control device 10 according to the first exemplary embodiment shown in FIG. 1.

The driver of the vehicle 1 depresses the brake pedal 7 (from OFF to ON) before the timing t1, and when the driver of the vehicle 1 pushes the button 22 of the push starter 21 at the timing t1, the ignition power source is turned on, and the engine ECU 80 and the idle stop ECU 70 start to operate, and the battery 5 supplies electric power through the high voltage side terminal +BB to the high voltage side terminal +B of the engine control device 10.

Further, the push starter 21 transmits the initial start intention signal of a high level (ON, H level) to the engine start control section 72. When receiving the initial start intention signal of a high level (ON, H level), the engine start control section 72 transmits the engine start signal of a high level (ON, H level) to the high voltage side driver 51. As a result, the high voltage side driver 51 is turned on, and the electric power is supplied to the starter 30 from the high voltage side terminal +B of the engine control device 10, and the starter 30 starts to operate.

When the rotation speed of the engine 2 increases and exceeds the predetermined rotation speed at the timing t2, the continuous rotation detection section 82 detects that the engine 2 has been in the continuous operation (OK, see FIG. 6). Accordingly, the engine restart finish detection section 73 detects that the start process of the engine 2 has been finished. When the engine restart finish detection section 73 detects that that the start process of the engine 2 has been finished, the transmission of the initial start intention signal of a high level (ON, H level) to the idle stop ECU 70 is halted, i.e. the initial start intention signal is switched from the high level to the low level (OFF, L level), and the engine start signal of a high level (ON, H level) to the high voltage side driver 51 is halted, i.e. the engine start signal is switched from the high level to the low level (OFF, L level). This stops the operation of the starter 30.

Feature (1)

As previously explained, the engine control device 10 according to the first exemplary embodiment is applied to, i.e. mounted on the vehicle 1. The vehicle has the engine 2, the push starter 21, and the starter 30. The push starter 21 generates and transmits the initial engine start intention signal when detecting the driver's intention to start the engine 2. Specifically, the push starter 21 generates and transmits the initial engine start intention signal when the driver of the vehicle 1 pushes the button 22. The initial engine start intention signal corresponds to the driver's intention to start the engine 2 of the vehicle which has stopped. When receiving electric power, the starter 30 rotates the driving shaft 3 of the engine 2 so as to start the engine 2.

The engine control device 10 according to the first exemplary embodiment controls the operation of the engine 2. The control device 10 has the automatic engine stop control section 71, the engine start control section 72, the engine restart finish detection section 73 and the automatic engine stop permission section 74.

The automatic engine stop control section 71 instructs the engine 2 to automatically stop when the automatic engine stop condition is satisfied.

The engine start control section 72 executes the power supply control to supply electric power to the starter 30 when receiving the initial engine start intention signal transmitted from the push starter 21 or when the automatic engine start condition is satisfied. This makes it possible to execute the engine start process.

The engine restart finish detection section 73 detects whether the start operation of the engine 2 has finished.

The automatic engine stop permission section 74 permits the automatic engine stop control section 71 to stop the engine 2 when the engine restart finish detection section 73 has detected that the engine start has finished after the engine start control section 72 has received the initial engine start intention signal transmitted from the push starter 21.

As previously explained, the engine control device 10 according to the first exemplary embodiment can detect whether the engine start control section 72 can start the engine start process of the engine 2 when the vehicle 1 has stopped. When the detection result indicates that the engine 2 can start by the control of the engine start control section 72, the engine control device 10 permits the automatic engine stop control section 71 to execute the automatic engine stop of the engine 2. Accordingly, in a case in which the vehicle 1 is running in the inertia travelling state or the decelerating state after the engine start, when the automatic engine stop condition is satisfied, it is possible for the automatic engine stop control section 71 to stop the engine 2. This makes it possible to increase the frequency of executing the automatic engine stop process when compared with the conventional engine control devices. This makes it possible to further reduce the fuel consumption of the vehicle 1.

Feature (2)

The engine control device 10 further has the vehicle state detection section 81 which detects the state of the vehicle 1. That is, the automatic engine stop control section 71 can instruct the engine 2 to automatically stop when the vehicle state detection section 81 detects that the vehicle 1 is in one of the inertia travelling state, the decelerating state and the stopped state, and the automatic engine stop control section 71 detects that the automatic engine stop condition is satisfied.

The engine control device 10 according to the first exemplary embodiment can stop the engine 2 operating even if the vehicle 1 is coasting or decelerating in the inertia travelling state or the decelerating state.

Feature (3)

The engine control device 10 further has the continuous rotation detection section 82 which detects whether the engine 2 is in the continuous operation state.

When the continuous rotation detection section 82 detects that the engine 2 is in the continuous operation state, the engine restart finish detection section 73 judges that the engine start has correctly finished.

Feature (4)

The continuous rotation detection section 82 detects that the engine 2 is in the continuous operation state when the rotation speed of the engine 2 has exceeded the predetermined rotation speed.

Feature (5)

The engine control device 10 according to the first exemplary embodiment has the casing 61 which accommodates at least the engine restart finish detection section 73, the casing 62 which accommodates at least the continuous rotation detection section 82, and the signal lines connected between the engine restart finish detection section 73 and the continuous rotation detection section 82, and control signals are transmitted through the signal lines 65. That is, the continuous rotation detection section 82 transmits control signals which correspond to the judgement result and detection results to the engine restart finish detection section 73 through the signal lines 65. Accordingly, it is possible for the idle stop ECU 70 to receive the judgment results and detection results transmitted from the continuous rotation detection section 82 through the signal lines 65 without using a conventional structure in which the casing 61 accommodates both the idle stop ECU 70 and the continuous rotation detection section 82. This structure makes it possible to reduce the overall size of the casing 61 which accommodates the idle stop ECU 70.

Feature (6)

During the engine start process, the engine start control section 72 can halt the power supply from supplying electric power to the starter 30 when the engine restart finish detection section 73 detects that the engine start has been finished. This makes it possible to reduce the fuel consumption of the starter 30 after the complete combustion of the engine 2 has been finished.

Feature (8)

The engine control device 10 according to the first exemplary embodiment further has the inhibitor switch 23 which is arranged between the push starter 21 and the engine start control section 72, and allows the signal transmission between the push starter 21 and the engine start control section 72.

Feature (9)

Further, the engine control device 10 according to the first exemplary embodiment has the push starter 21 which acts as the initial engine start intention detection device. The push starter 21 has the button 22. When the driver of the vehicle 1 intends to start the vehicle 1, the driver pushes the button 33 in the push starter 21, and the starter 30 starts to operate.

Second Exemplary Embodiment

A description will be given of the engine control device 10 according to the second exemplary embodiment with reference to FIG. 7.

Figure 7:
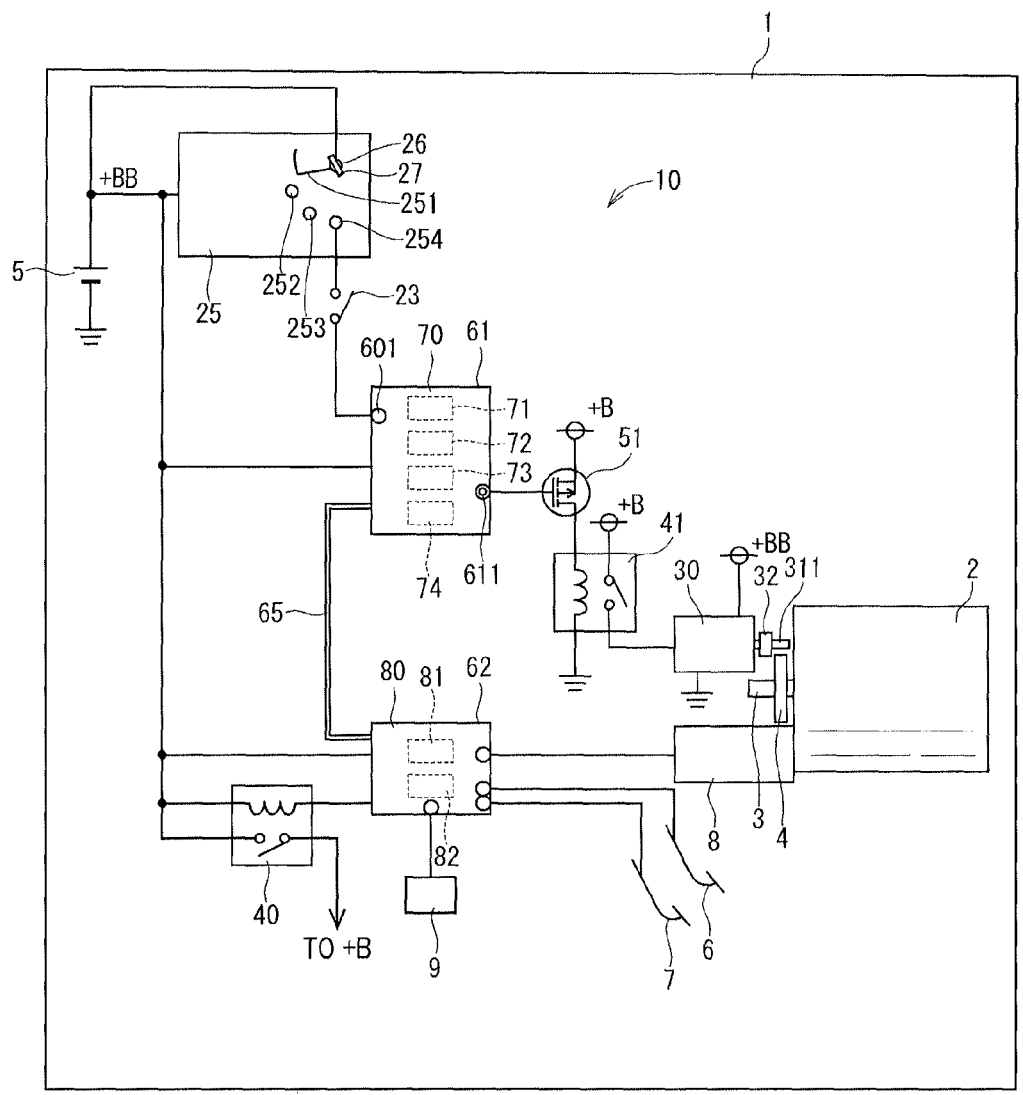
FIG. 7 is a schematic view showing an engine control device according to a second exemplary embodiment of the present invention and a vehicle equipped with the engine control device.

FIG. 7 is a schematic view showing the engine control device 10 according to the second exemplary embodiment and the vehicle 1 equipped with the engine control device 10.

The engine control device 10 according to the second exemplary embodiment shown in FIG. 7 has the initial engine start detection section which is different in structure from that according to the first exemplary embodiment. Other components between the second exemplary embodiment and the first exemplary embodiment are same.

The engine control device 10 according to the second exemplary embodiment has a key starter 25. The key starter 25 has a key-insertion hole 26, a terminal 251, an ACC contact 252, an IG contact 253 and a START contact 254.

As shown in FIG. 7, the driver of the vehicle 1 inserts the key 27 into the key-insertion hole 26 of the key starter 25. Because the terminal 251 and the key-insertion hole 26 are assembled together, the terminal 251 and the key-insertion hole 26 are turned together. One end part of the terminal 251 is connected to the high voltage side terminal +BB of the battery 5.

As shown in FIG. 7, the ACC contact 252, the IG contact 253 and the START contact 254 are arranged to be in contact with the other end part of the terminals 251, respectively, when the driver of the vehicle 1 turns the key 27 inserted in the key-insertion hole 26.

The ACC contact 252 is connected to the high voltage side of the accessory power source. The IG contact 253 is connected to the high voltage side of the ignition power source. The START contact 254 is connected to the inhibitor switch 23.

The other end part of the terminal 251 has a length to connect the ACC contact 252 with the IG contact 253, or the IG contact 253 with the START contact 254.

Accordingly, when the driver of the vehicle 1 inserts the key 27 into the key-insertion hole 26 of the key starter 25, and turns the key 27 clockwise, for example, the other end part of the terminal 251 is firstly in contact with the ACC contact 252 only. This turns on the accessory power source. The driver of the vehicle 1 further turns the key 27 clockwise, the other end part of the terminal 251 becomes in contact with the IG contact 253 and the ACC contact 252 simultaneously. This turns on both the accessory power source and the ignition power source.

Still further, the driver of the vehicle 1 further turns the key 27 clockwise, the other end part of the terminal 251 becomes in contact with the IG contact 253 and the START contact 254 and the ACC contact 252 simultaneously, and separate from the ACC contact 252. This turns off the accessory power source, and continues the turned-on state of the ignition power source, and the battery voltage is supplied to the inhibitor switch 23. In this situation, the driver of the vehicle 1 releases the key 27, and the key-insertion hole 26 and the terminal 251 turn counterclockwise by the force of a spring member (not shown). The other end part of the terminal 251 continues the contact state with the ACC contact 252 and the IG contact 253.

Under a state in which the vehicle stops and the selector lever is in the P position, on which the engine control device 10 according to the second exemplary embodiment is mounted, when the driver of the vehicle 1 inserts the key 27 into the key-insertion hole 26 of the key starter 25, and turns the key 27 to the START position so that the other end part of the terminal 251 is in contact with the START contact 254, the battery voltage is supplied from the high voltage side terminal +B to the input section 601 of the idle stop ECU 70 through the key starter 25 and the inhibitor switch 23. That is, it is possible for the engine control device 10 according to the second exemplary embodiment to detect the driver's initial engine start intention to start the engine 2 through the key starter 25, and transmit the initial engine start intension signal to the idle stop ECU 70.

Further, in the engine control device 10 according to the second exemplary embodiment, the engine start control section 72 continues to supply electric power to the starter 30 while the driver of the vehicle 1 keeps the key 27 at the START position, i.e. the key starter 25 continues transmitting the initial engine start intention signal to the engine start control section 72. Other components of the engine control device according to the second exemplary embodiment have the same structure and operation of those in the engine control device according to the first exemplary embodiment.
Feature (10) As previously explained, the engine control device 10 according to the second exemplary embodiment has the key starter 25 which acts as the initial engine start intention detection device. The key starter 25 has the key-insertion hole 26 into which the key 27 is inserted.
Feature (7)

The engine start control section 72 can continuously supply electric power to the starter 30 while the key starter 25 transmits the initial engine start intention signal to the engine start control section 72. This makes it possible to reduce an occurrence of an uncomfortable state in which the starter 30 stops driving the engine 2 when the driver of the vehicle 1 keeps the key 27 in the START position.

Third Exemplary Embodiment

A description will be given of the engine control device 10 according to the third exemplary embodiment with reference to FIG. 8.

Figure 8:
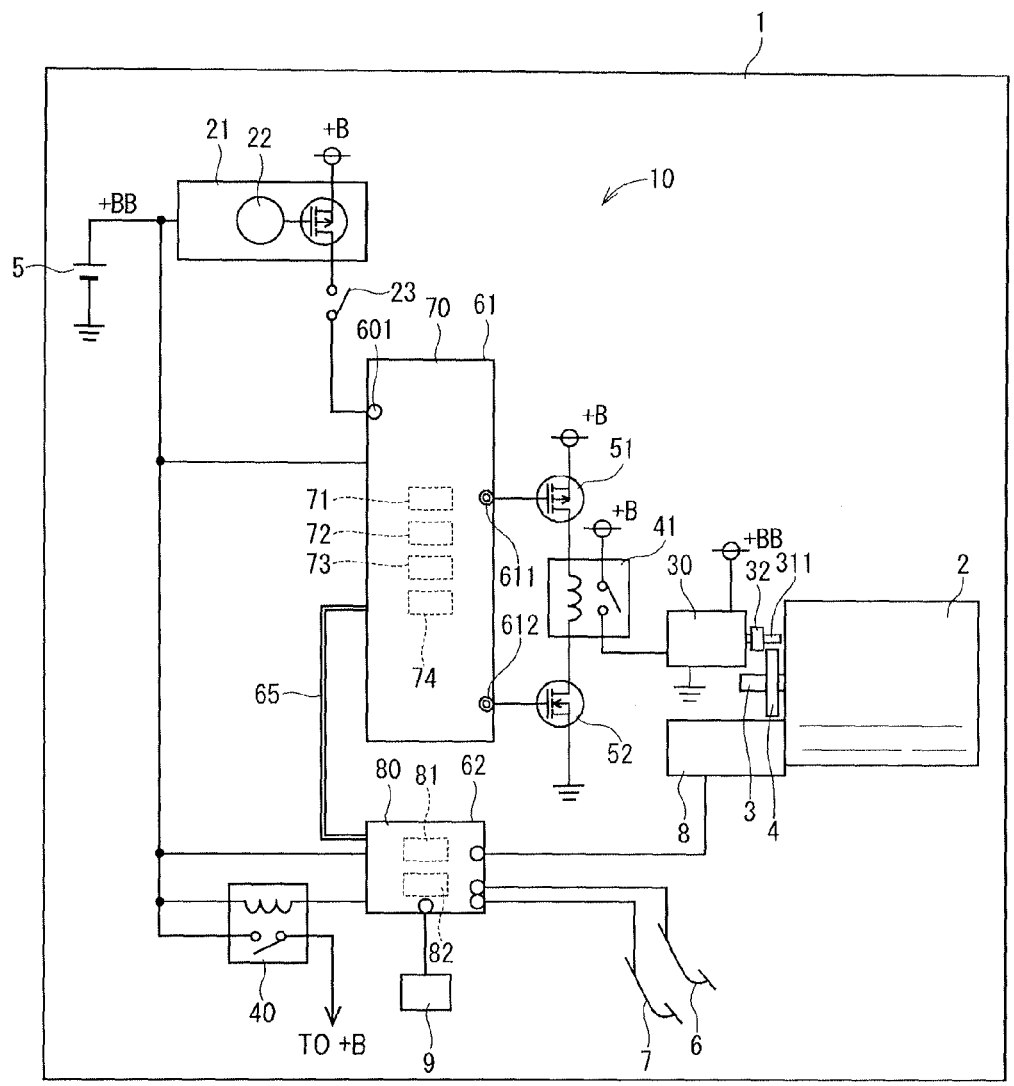
FIG. 8 is a schematic view showing an engine control device according to a third exemplary embodiment of the present invention and a vehicle equipped with the engine control device.

FIG. 8 is a schematic view showing the engine control device 10 according to the third exemplary embodiment and the vehicle 1 equipped with the engine control device 10. As shown in FIG. 8, the number of components forming the engine control device 10 according to the third exemplary embodiment is more than the number of components forming the engine control device 10 according to the first exemplary embodiment. That is, the engine control device 10 according to the third exemplary embodiment further has a low voltage side driver 52 when compared with the structure of the engine control device 10 according to the first exemplary embodiment.

For example, the low voltage side driver 52 is a n-MOS switching element. The low voltage side driver 52 is arranged at a low voltage side when compared with the relay 41. A drain of the low voltage side driver 52 is connected to the coil of the relay 41, a source of the low voltage side driver 52 is grounded. A gate of the low voltage side driver 52 is connected to the output section 612 if the idle stop ECU 70.

In the structure of the engine control device 10 according to the third exemplary embodiment, when receiving the initial start intention signal of a high level (ON, H level) transmitted from the push starter 21 or the automatic engine start condition is satisfied, the engine start control section 72 transmits the engine start signal of a high level (ON, H level) to the high voltage side driver 51 through the output section 611, and also transmits the engine start signal of a high level (ON, H level) to the low voltage side driver 52 through an output section 612. This makes it possible to turn on both the high voltage side driver 51 and the low voltage side driver 52, and to allow a current to flow from the high voltage side terminal +B to the ground through the high voltage side driver 51, the relay 41 and the low voltage side driver 52. This control process starts the engine 2 to operate. As a result, the starter 30 starts to operate and the engine 2 starts to operate.

Other components of the engine control device according to the third exemplary embodiment have the same structure and operation of those in the engine control device according to the first exemplary embodiment.
Feature (11)

As previously explained, the engine control device 10 according to the third exemplary embodiment has the low voltage side driver 52 in addition to the relay 41, the high voltage side driver 51. When receiving electric power, the relay 41 allows the electric power supply to supply electric power to the starter 30. The high voltage side driver 51 is arranged at the high voltage side when compared with the location of the relay 41. Accordingly, when receiving the control signal, the high voltage side driver 51 allows the electric power supply from the high voltage side to the relay 41. On the other hand, the low voltage side driver 52 is arranged at the low voltage side when compared with the location of the relay 41. Accordingly, when receiving the control signal, the low voltage side driver 52 allows the electric power supply from the relay 41 to the low voltage side, or inhibits the power supply from the relay 41 to the low voltage side.

Accordingly, even if one of the high voltage side driver 51 and the low voltage side driver 52 is fixed to the turned-on state caused by a malfunction of a wire-harness, the structure of the engine control device 10 according to the third exemplary embodiment makes it possible to continue the correct control to the relay 41 by transmitting the control signal to the other driver. This makes it possible to increase and improve the reliability of the engine control device.

Fourth Exemplary Embodiment

A description will be given of the engine control device 10 according to the fourth exemplary embodiment with reference to FIG. 9.

Figure 9:
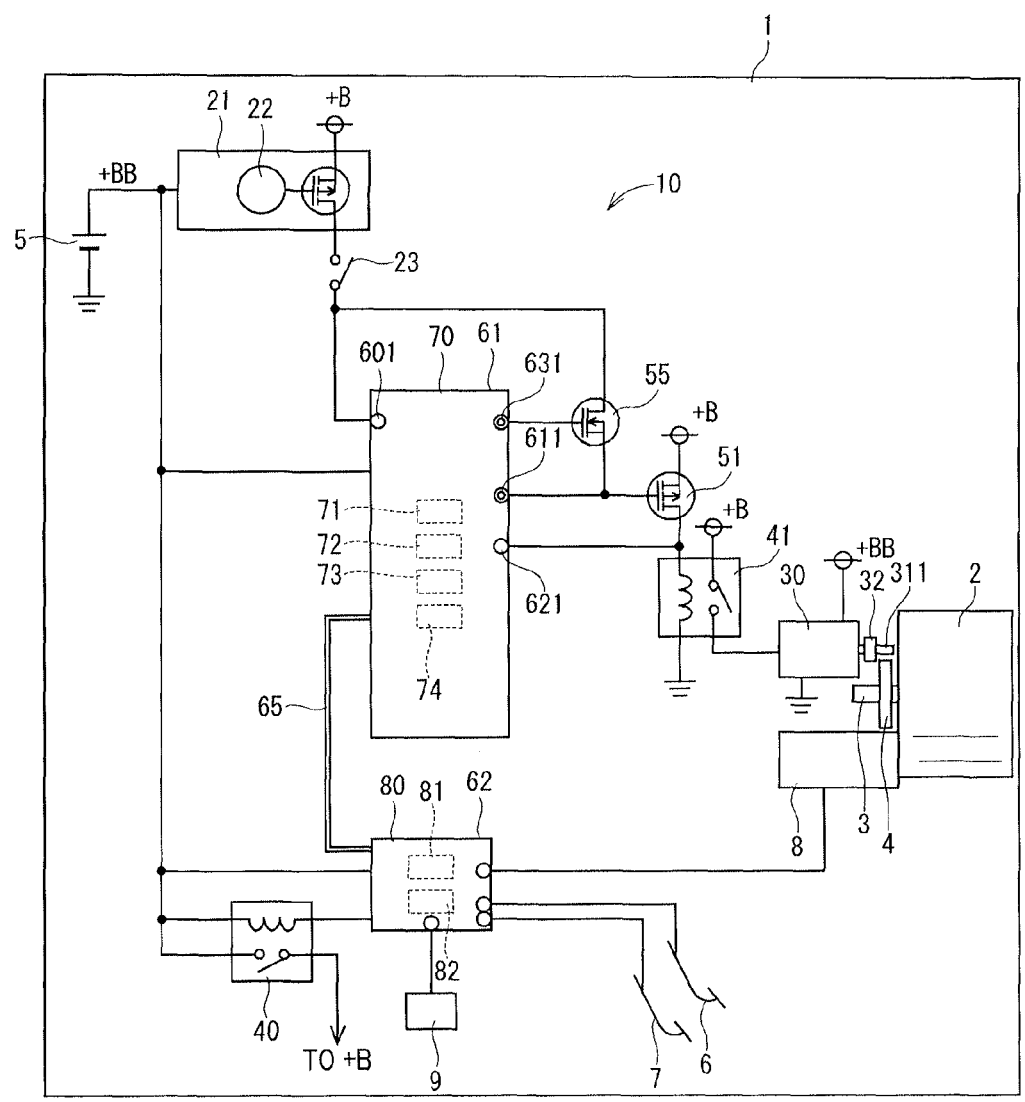
FIG. 9 is a schematic view showing an engine control device according to a fourth exemplary embodiment of the present invention and a vehicle equipped with the engine control device.

FIG. 9 is a schematic view showing the engine control device 10 according to the fourth exemplary embodiment and the vehicle 1 equipped with the engine control device 10. As shown in FIG. 9, the number of components forming the engine control device 10 according to the fourth exemplary embodiment is more than the number of components forming the engine control device 10 according to the first exemplary embodiment. That is, the engine control device 10 according to the fourth exemplary embodiment further has a bypass driver 55 which corresponds to a bypass start section.

The bypass driver 55 is a n-MOS switching element, for example. The bypass driver 55 electrically connects its drain with its source when the gate of the bypass driver 55 receives no turning-ON signal. On the other hand, when the gate of the bypass driver 55 receives the turning-ON signal, the drain is electrically disconnected from the source of the bypass driver 55. That is, the bypass driver 55 is a switching element of a normally turned-on type.

The bypass driver 55 is arranged between the push starter 21 and the starter 30 to bypass the engine start control section 72. Specifically, the drain of the bypass driver 55 is connected to a connection node between the inhibitor switch 23 and the input section 601 of the idle stop ECU 70. The source of the bypass driver 55 is connected to a connection node between the gate of the high voltage side driver 51 and the output section 611 of the idle stop ECU 70.

In the engine control device 10 according to the fourth exemplary embodiment shown in FIG. 9, the idle stop ECU 70 starts to operate when receiving the ignition voltage. When the engine start control section 72 is operating correctly, the engine start control section 72 continuously transmits the ON signal of a high level (ON, H level) to the bypass driver 55 through the output section 631 of the idle stop ECU 70. This turns off the bypass driver 55. At this time, the push starter 21 transmits the initial engine start intention signal of a high level (ON, H level) to the idle stop ECU 70 and the bypass driver 55. When the idle stop ECU 70 receives the initial engine start intention signal through the input section 601, the initial engine start intention signal is transmitted to the engine start control section 72. When receiving receives the initial engine start intention signal, the engine start control section 72 transmits the engine start signal of a high level (ON, H level) to the high voltage side driver 51. As a result, electric power is supplied to the relay 41, the starter 30 starts to operate, and the engine 2 starts to operate.

On the other hand, when the engine start control section 72 is abnormal, the engine start control section 72 does not transmit the engine start signal to the bypass driver 55 through the output section 631. In this abnormality state, the turned-on state of the bypass driver 55 is continuously maintained. When receiving the initial engine start intention signal of a high level (ON, H level) transmitted from the push starter 21, the engine start control section 72 does not generate and transmit the engine start signal to the high voltage side driver 51 because the engine start control section 72 is abnormal.

On the other hand, when the push starter 21 transmits the initial engine start intention signal of a high level (ON, H level), the gate of the high voltage side driver 51 receives the initial engine start intention signal of a high level (ON, H level) through the bypass driver 55 of the turned-on state. Accordingly, the electric power is supplied to the relay 41, the starter 30 thereby starts to drive the engine 2 to operate.

In the structure of the engine control device 10 according to the fourth exemplary embodiment, as previously explained, the bypass driver 55 is arranged between the push starter 21 and the starter 30 so as to bypass the engine start control section 72.

When receiving the initial engine start intention signal of a high level (ON, H level) transmitted from the push starter 21, the bypass driver 55 allows the power supply to supply electric power to the starter 30. When receiving electric power, the starter starts to operate and the engine 2 starts to operate.

Further, the engine control device 10 according to the fourth exemplary embodiment inhibits the bypass driver 55 from driving the engine 2 to start when the engine start control section 72 is operating correctly. On the other hand, when the engine start control section 72 is abnormal, the engine control device 10 according to the fourth exemplary embodiment allows the bypass driver 55 to drive the starter 30 so as to start the engine 2.

Still further, the automatic engine stop permission section 74 inhibits the automatic engine stop control section 71 from stopping the engine 2 when the engine 2 is started by the control of the bypass driver 55, i.e. the engine start control section 72 is abnormal.

In the engine control device 10 according to the fourth exemplary embodiment, the idle stop ECU 70 has the input section 621. The input section 621 is arranged between the drain of the high voltage side driver 51 and the coil of the relay 41. Accordingly, when the high voltage side driver 51 is turned on, the battery voltage is supplied to the input section 621. Hereinafter, this battery voltage will be referred to as the "monitor signal".

In a case in which when the engine start control section 72 does not transmits the engine start signal of a high level (ON, H level), but the input section 621 receives the monitor signal of a high level (ON, H level) nevertheless, the idle stop ECU 70 can detect that the high voltage side driver 51 receives the initial engine start intention signal transmitted from the push starter 21 through the bypass driver 55 before the bypass driver 51 is not in the turned-off state and the engine start control section 72 transmits the engine start signal to the high voltage side driver 51.

After this, when the engine start signal of a high level (ON, H level) is outputted through the output section 611 to the bypass driver 55, and the starter 30 starts the engine 2, and the engine 2 starts to operate, the engine control device 10 judges that the engine start control section 72 is operating correctly, and permits the automatic engine stop control section 71 to stop the engine 2.

On the other hand, when no engine start signal is outputted through the output section 611 to the bypass driver 55, and the bypass driver 55 drives the engine 2 to start, the engine control device 10 judges that the engine start control section 72 is abnormal, and inhibits the automatic engine stop control section 71 from stopping the engine 2.

Next, a description will now be given of the control process of the engine 2 executed by the engine control device 10 according to the fourth exemplary embodiment with reference to FIG. 10.

Figure 10:
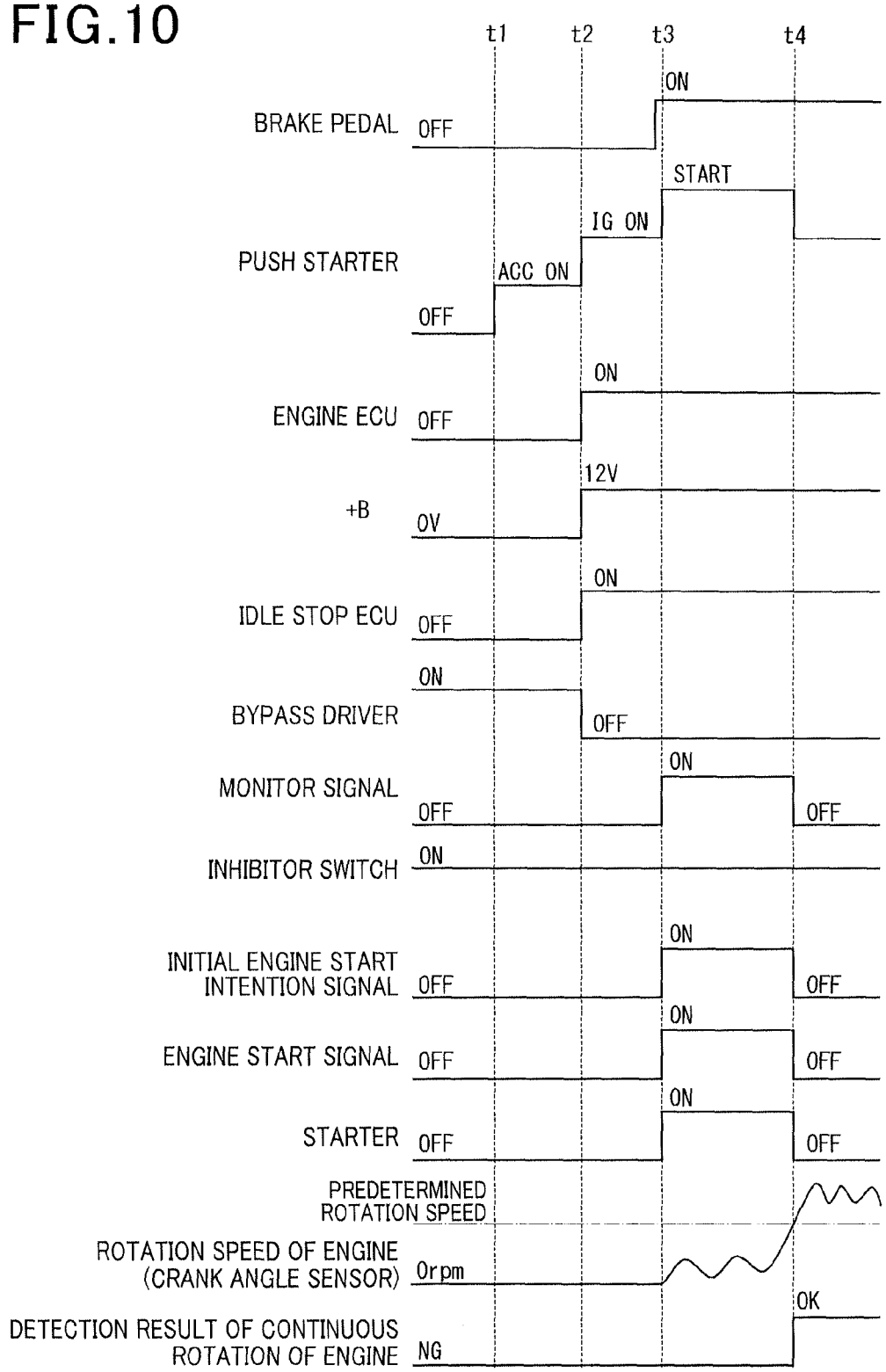
FIG. 10 is view showing a timing chart of an engine control process executed by the engine control device according to the fourth exemplary embodiment shown in FIG. 9.

FIG. 10 is view showing a timing chart of the engine control process executed by the engine control device 10 according to the fourth exemplary embodiment shown in FIG. 9.

At a timing t1, when the driver of the vehicle 1 pushes the button 22 of the push starter 21, the accessory power supply is turned on.

At a timing t2, when the driver of the vehicle 1 pushes the button 22 of the push starter 21, the ignition power supply is turned on. This process starts the engine ECU 80 and the idle stop ECU 70 start to operate, the battery voltage is supplied to the high voltage side terminal +B. The engine start control section 72 in the idle stop ECU 70 transmits the ON signal of a high level (ON, H level) to the bypass driver 55 through the output section 631 of the idle stop ECU 70. The bypass driver is thereby turned off. This inhibits the bypass driver 55 from starting the engine 2.

When the driver of the vehicle 1 depresses the brake pedal 7 (from OFF to ON) before a timing t3, and when the driver of the vehicle 1 pushes the button 22 of the push starter 21 at the timing t3, the push starter 21 transmits the initial start intention signal of a high level (ON, H level) to the engine start control section 72.

When receiving the initial start intention signal of a high level (ON, H level), the engine start control section 72 transmits the engine start signal of a high level (ON, H level) to the high voltage side driver 51. As a result, the high voltage side driver 51 is turned on, and the electric power is supplied to the starter 30 from the high voltage side terminal +B of the engine control device 10, and the starter 30 starts to operate. At this time, the input section 621 receives the monitor signal of a high level (ON, H level).

The rotation speed of the engine thereby increases. When the rotation speed of the engine 2 exceeds the predetermined rotation speed, the continuous rotation detection section 82 detects that the engine 2 is in the continuous operation state. Accordingly, the engine restart finish detection section 73 detects that the start process of the engine 2 has been finished. When the engine restart finish detection section 73 detects that that the start process of the engine 2 has been correctly finished, the transmission of the initial start intention signal of a high level (ON, H level) to the idle stop ECU 70 is halted, i.e. the initial start intention signal is switched from the high level to the low level (OFF, L level), and the engine start signal of a high level (ON, H level) to the high voltage side driver 51 is also halted, i.e. the engine start signal is switched from the high level to the low level (OFF, L level). As a result, the starter 30 stops driving the engine 2. At the same time, the bypass driver 55 does not transmit the monitor signal to the input section 621 of the idle stop ECU 70. In other words, the input section 622 receives the monitor signal of a low level (OFF, L level).

Feature (15)

As previously explained in detail, the engine control device 10 according to the fourth exemplary embodiment further has the bypass driver 55. The bypass driver 55 is arranged between the push starter 21 and the starter 30 so as to bypass the engine start control section 72

When receiving the initial engine start intention signal of a high level (ON, H level) transmitted from the push starter 21, the bypass driver 55 allows the power supply to supply electric power to the starter 30. When receiving electric power, the starter 30 starts to drive the engine 2. Thereby the engine 2 starts to operate.

Further, the engine control device 10 according to the fourth exemplary embodiment inhibits the bypass driver 55 from starting the engine 2 through the starter 30 when the engine start control section 72 is operating correctly. On the other hand, when the engine start control section 72 is abnormal, the engine control device 10 according to the fourth exemplary embodiment allows the bypass driver 55 to drive the starter 30 so as to start the engine 2.

Accordingly, when the engine start control section 72 is operating correctly, the engine start control section 72 executes the initial start process of the engine 2. On the other hand, when the engine start control section 72 is abnormal, the engine control device 10 according to the fourth exemplary embodiment allows the bypass driver 55 to drive the starter 30 so as to start the initial start of the engine 2. The structure and operation of the engine control device 10 according to the fourth exemplary embodiment increases reliability at the initial engine start, i.e. when the engine 2 is started first.

Feature (16)

In the structure of the engine control device 10 according to the fourth exemplary embodiment, the automatic engine stop permission section 74 inhibits the automatic engine stop control section 71 from stopping the engine 2 when the engine 2 is started by the control of the bypass driver 55, i.e. the engine start control section 72 is abnormal. This control process makes it possible to avoid an occurrence of the case in which the automatic engine stop process of the engine 2 cannot be executed by the control of the engine start control section 72 after the engine 2 is stopped by the automatic engine stop control section 71.

Fifth Exemplary Embodiment

A description will be given of the engine control device 10 according to the fifth exemplary embodiment with reference to FIG. 11.

Figure 11:
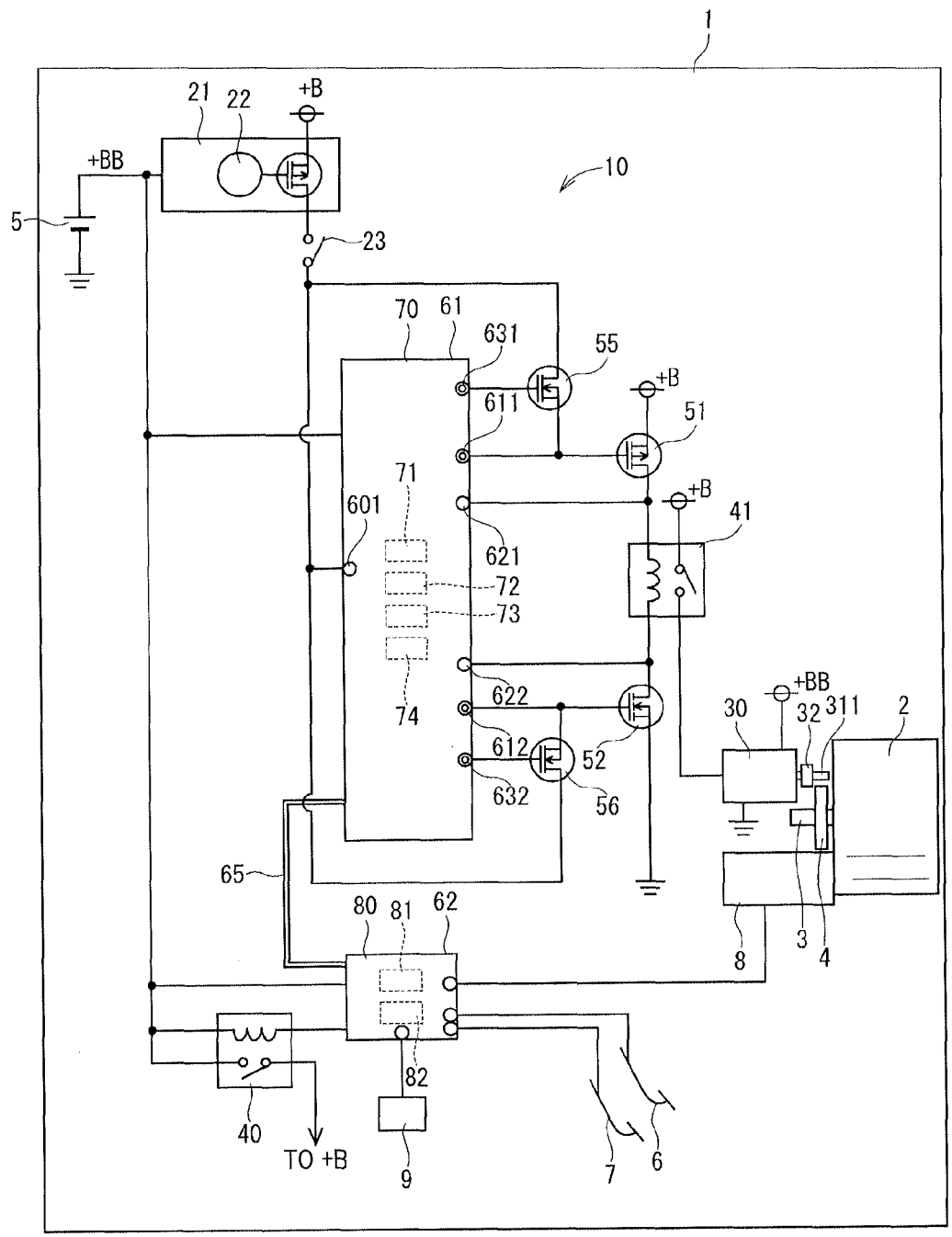
FIG. 11 is a schematic view showing an engine control device according to a fifth exemplary embodiment of the present invention and a vehicle equipped with the engine control device.

FIG. 11 is a schematic view showing the engine control device 10 according to the fifth exemplary embodiment and the vehicle 1 equipped with the engine control device 10. As shown in FIG. 11, the number of components forming the engine control device 10 according to the fifth exemplary embodiment is more than the number of components forming the engine control device 10 according to the third or fourth exemplary embodiment. That is, the engine control device 10 according to the fifth exemplary embodiment further has the low voltage side driver 52 and a bypass driver 56 which acts as a bypass start section.

The low voltage side driver 52 has the same component disclosed in the third exemplary embodiment. The explanation of the low voltage side driver 52 is omitted here for brevity.

For example, the bypass driver 56 is a n-MOS switching element of a normally turned-on type, like the bypass driver 55 explained in the fourth exemplary embodiment.

The bypass driver 56 is arranged between the push starter 21 and the starter 30 so as to bypass the engine start control section 72. Specifically, the drain of the bypass driver 56 is connected to the inhibitor switch 23 and the input section 601 of the idle stop ECU 70. The source of the bypass driver 56 is connected to a connection node between the gate of the low voltage side driver 52 and the output section 612 of the idle stop ECU 70. The gate of the bypass driver 56 is connected to the output section 632 of the idle stop ECU 70.

In the structure of the engine control device 10 according to the fifth exemplary embodiment shown in FIG. 11, when receiving the ignition voltage, the idle stop ECU 70 starts to operate. When the engine start control section 72 is operating correctly, the engine start control section 72 continuously transmits the ON signal of a high level to the bypass driver 55 and the bypass driver 56 through the output section 631 and the output section 632. Accordingly, both the bypass driver 55 and the bypass driver 56 are turned off.

When the push starter 21 transmits the initial engine start intention signal of a high level (ON, H level) to the idle stop ECU 70, the engine start control section 72 receives the initial engine start intention signal of a high level (ON, H level) through the input section 601 in the idle stop ECU 70.

The engine start control section 72 transmits the engine start signal of a high level (ON, H level) to the high voltage side driver 51 and the low voltage side driver 52 through the output section 611 and the output section 612, respectively. Accordingly, the electric power is supplied to the relay 41 and the starter 30 starts to drive the engine 2 to operate.

On the other hand, when the engine start control section 72 operates abnormal, the engine start control section 72 outputs no ON signal, i.e. transmits the ON signal of a low level (OFF, L level) to the bypass driver 55 and the bypass driver 56. Accordingly, both the bypass driver 55 and the bypass driver 56 are turned on. In this abnormality state of the engine start control section 72, when receiving the initial engine start intention signal of a high level (ON, H level) transmitted from the push starter 21, the engine start control section 72 does not generate and transmit the engine start signal to the high voltage side driver 51 and the low voltage side driver 52.

On the other hand, when the push starter 21 transmits the initial engine start intention signal of a high level (ON, H level), the gate of the high voltage side driver 51 and the gate of the low voltage side driver 52 receive the initial engine start intention signal of a high level (ON, H level) through the bypass driver 55 of the turned-on state and the bypass driver 56 of the turned-on state, respectively. Accordingly, the electric power is supplied to the relay 41, the starter 30 starts to drive the engine 2 to operate. The engine 2 thereby starts to operate.

As previously explained, the bypass driver 55 and the bypass driver 56 are arranged between the push starter 21 and the starter 30 so as to bypass the engine start control section 72. When receiving the initial engine start intention signal of a high level (ON, H level) transmitted from the push starter 21, the bypass driver 55 and the bypass driver 56 allow the power supply to the starter 30, and as a result, the starter 30 can drive the engine 2 to start.

Further, in the structure of the engine control device 10 according to the fifth exemplary embodiment, when the engine start control section 72 is operating correctly, the engine start control section 72 inhibits the bypass driver 55 and the bypass driver 56 from driving the engine 2 to start. On the other hand, when the engine start control section 72 operates abnormal, the engine start control section 72 allows the bypass driver 55 and the bypass driver 56 to drive the engine 2 to start.

Further, when the engine 2 starts by the control of the bypass driver 55 and the bypass driver 56, i.e. when the when the engine start control section 72 operates abnormal, the automatic engine stop permission section 74 inhibits the automatic engine stop control section 71 from stopping the engine 2 operating. Other features and structure of the engine control device 10 according to the fifth exemplary embodiment are the same of those in the engine control device 10 according to the third and fourth exemplary embodiments.

As previously explained in detail, the engine control device 10 according to the fifth exemplary embodiment has the improved structure in which the high voltage side driver 51 and the low voltage side driver 52 are arranged to the relay 41, the bypass driver 55 is connected to the high voltage side driver 51, and the bypass driver 56 is connected to the low voltage side driver 52. According to the fifth exemplary embodiment has the same effects of the third exemplary embodiment and the fourth exemplary embodiment.

Sixth Exemplary Embodiment

A description will be given of the engine control device 10 according to the sixth exemplary embodiment with reference to FIG. 12.

Figure 12:
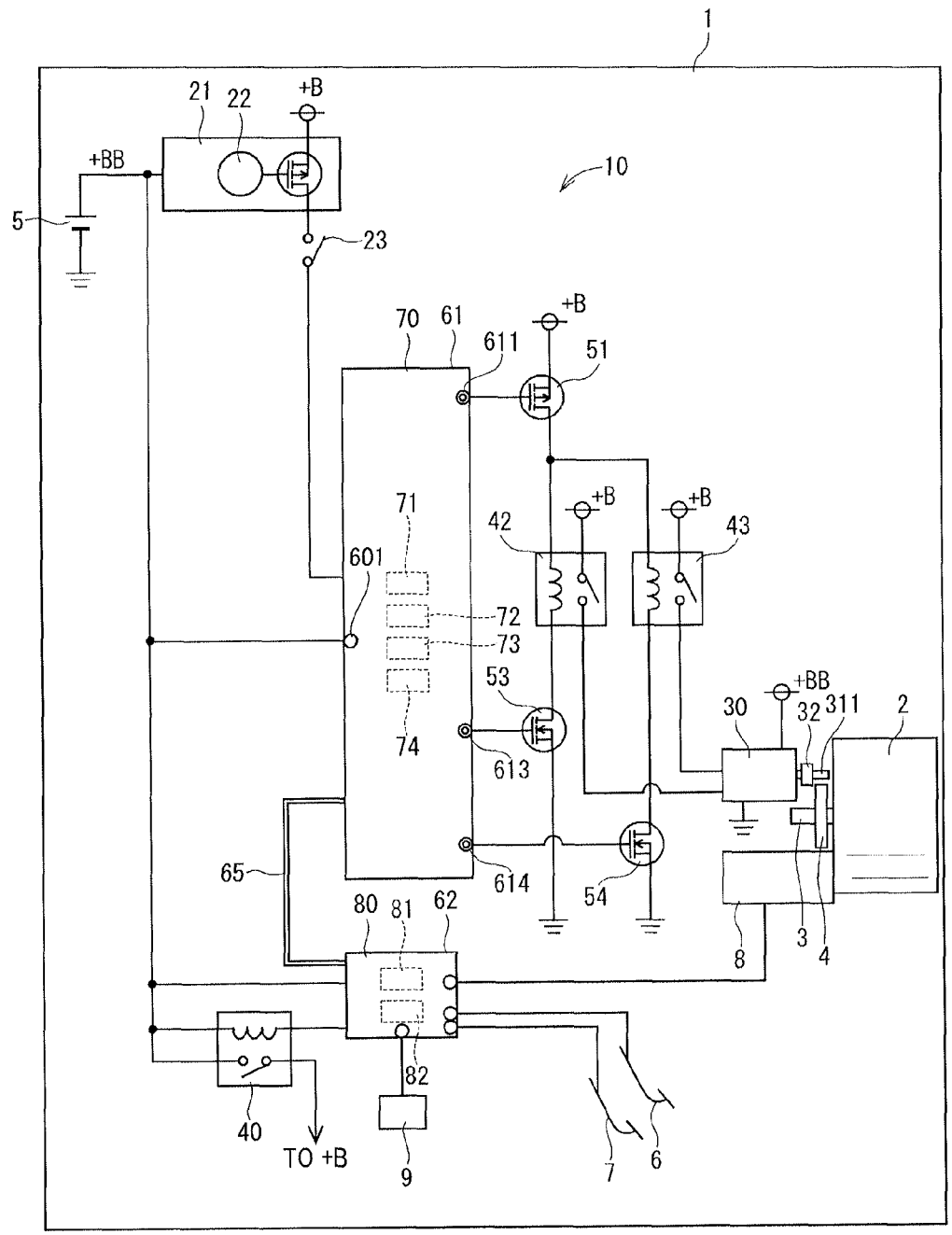
FIG. 12 is a schematic view showing an engine control device according to a sixth exemplary embodiment of the present invention and a vehicle equipped with the engine control device.

FIG. 12 is a schematic view showing the engine control device 10 according to the sixth exemplary embodiment and the vehicle 1 equipped with the engine control device 10. As shown in FIG. 12, the number of components forming the engine control device 10 according to the sixth exemplary embodiment is more than the number of components forming the engine control device 10 according to the third exemplary embodiment. Further, the engine control device 10 according to the sixth exemplary embodiment has the starter 30 having a structure which is different from the structure of the starter 30 used in the third exemplary embodiment.

The engine control device 10 according to the sixth exemplary embodiment has a relay 42, a relay 43, a low voltage side driver 53 and a low voltage side driver 54 instead of using the relay 41 and the low voltage side driver 52 used in the engine control device 10 according to the third exemplary embodiment.

Each of the relay 42 and the relay 43 is a mechanical relay, like the relay 41. One end of a coil in the relay 42 is connected to the drain of the high voltage side driver 51, one terminal (which is opposite to the high voltage side terminal B+) of a movable contact in the relay 42 is connected to the starter 30.

Similar to the relay 42, one end of a coil in the relay 43 is connected to the drain of the high voltage side driver 51, one terminal (which is opposite to the high voltage side terminal B+) of a movable contact in the relay 43 is connected to the starter 30.

Similar to the low voltage side driver 52, each of the low voltage side driver 53 and the low voltage side driver 54 is an n-MOS switching element.

The drain of the low voltage side driver 53 is connected to the coil in the relay 42, the source of the low voltage side driver 53 is grounded or earthed, and the gate of the low voltage side driver 53 is connected to the output section 613 in the idle stop ECU 70.

Further, the drain of the low voltage side driver 54 is connected to the coil in the relay 43, the source of the low voltage side driver 54 is grounded or earthed, and the gate of the low voltage side driver 54 is connected to the output section 614 in the idle stop ECU 70.

Figure 13:
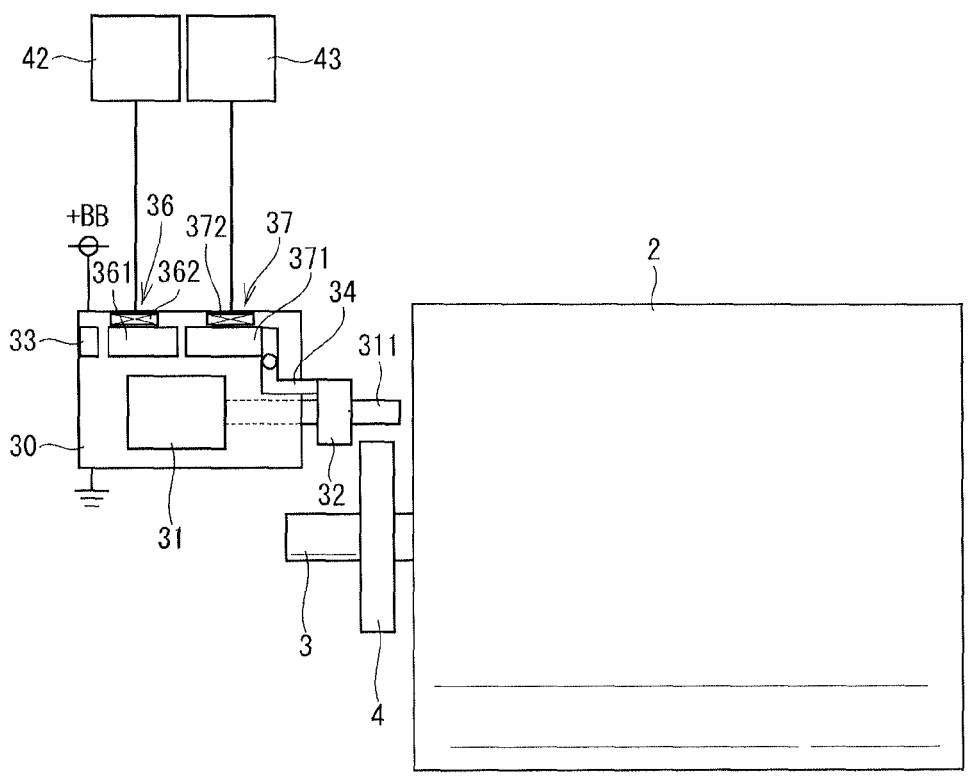
FIG. 13 is a view showing a starter as an engine start device and an internal combustion engine which are target devices to be controlled by the engine control device according to the sixth exemplary embodiment shown in FIG. 12.

FIG. 13 is a view showing the starter 30 and the engine 2 which are target devices to be controlled by the engine control device 10 according to the sixth exemplary embodiment shown in FIG. 12.

As shown in FIG. 13, the starter 30 has solenoid 36 and a solenoid 37 instead of using the solenoid 35 used in the engine control device 10 according to the third exemplary embodiment.

The solenoid 36 has a core 361 and a coil 362. The core 361 in the solenoid 36 is movably arranged to be in contact with the power supply section 33. The coil 362 in the solenoid 36 is arranged in contact with the movable contact of the relay 42.

When electric power is supplied to the coil 362, the core 361 moves to the power supply section 33 of the starter 30.

When the core 361 is in contact with the power supply section 33, the electric power is supplied to the motor 31. When receiving electric power, the motor 31 generates an output torque and outputs the generated output torque to the engine 2 through the motor shaft 311. When receiving electric power, the solenoid 36 allows the power supply to the motor 31. The solenoid 36 corresponds to the motor power supply permission section.

The solenoid 37 has a core 371 and a coil 372. The core 371 is arranged at the core 361 side so that the core 371 is in contact with a pushing member 34. The coil 372 is in contact with a movable member of the relay 43. When electric power is supplied to the coil 372, the core 371 in the solenoid 37 is moved to the core 361 side. When the core 371 is moved and in contact with the core 361, the pushing member 34 turns so that the pinion gear 32 is pushed to the ring gear 4, and the pinion gear 32 is engaged with the ring gear 4. As previously explained, when receiving electric power, the solenoid 37 can push the pinion gear 32 to the ring gear 4 so that the pinion gear 32 is correctly engaged with the ring gear 4 fixed to the driving shaft 3 of the engine 2. The solenoid 37 corresponds to the pushing section.

The engine control device 10 according to the sixth exemplary embodiment has the solenoid 36 and the solenoid 37. This structure makes it possible to independently control the power supply to the motor 31 and the pushing process to the pinion gear 32 by controlling the power supply to each of the solenoid 36 and the solenoid 37.

For example, when the engine start control section 72 executes the power supply to the motor 31, it is sufficient for the idle stop ECU 70 to transmit the engine start signal of a high level (ON, H level) to the high voltage side driver 51 and the low voltage side driver 53 through the output section 611 and the output section 613.

Further, when the engine start control section 72 executes the pushing process of the pinion gear 32 to the ring gear 4, it is sufficient for the idle stop ECU 70 to transmit the engine start signal of a high level (ON, H level) to the high voltage side driver 51 and the low voltage side driver 54 through the output section 611 and the output section 614.

Still further, when the automatic engine start condition is satisfied during the rotation of the driving shaft 3 of the engine 2 after the automatic engine stop of the engine 2 has executed by the automatic engine stop control section 71, the engine start control section 72 allows the power supply to the coil 362 in the solenoid 36 so as to rotate the motor 31. After this, when the rotation speed of the pinion gear 32 is approximately the same as the rotation speed of the ring gear 4, the engine start control section 72 executes the power supply to the coil 372 in the solenoid 37 so as to push the pinion gear 32 to the ring gear 4. As a result, the pinion gear 32 is correctly engaged with the ring gear. Because the ring gear 4 is fixed to the driving shaft 3 of the engine 2, the engine 2 thereby starts to operate.

Under the situation in which the vehicle 1 has stopped, i.e. the driving shaft 3 does not rotate, when the automatic engine start condition is satisfied, the engine start control section 72 executes the power supply to the coil 372 in the solenoid 37 so as to push the pinion gear 32 to the ring gear 4. After the pinion gear 32 is correctly engaged with the ring gear 4, the engine start control section 72 executes the power supply to the coil 362 in the solenoid 36 to turn the motor 31. This drives the engine 2 to start.

As previously explained, the starter 30 in the engine control device 10 according to the sixth exemplary embodiment can execute the smooth engagement of the pinion gear 32 with the ring gear 4 even if the driving shaft 3 of the engine 2 is rotating.

Feature (12)

As previously explained, the starter 30 in the engine control device 10 according to the sixth exemplary embodiment has the motor 31, the pinion gear 32, the solenoid 36 and the solenoid 37. The pinion gear rotates by the rotation power of the motor 31. When receiving electric power, the solenoid 36 allows the power supply to the motor 31. When receiving electric power, the solenoid 37 pushes the pinion gear 32 to the ring gear 4 so as to engage the pinion gear 32 with the ring gear 4 fixed to the driving shaft 3 of the engine 2.

Feature (13)

The engine control device 10 according to the sixth exemplary embodiment has the relay 42, the relay 43, the high voltage side driver 51, the low voltage side driver 53 and the low voltage side driver 54. When receiving electric power, the relay 42 and the relay 43 allow the power supply to the starter 30, and inhibit the power supply to the starter 30 when the power supply to the relays 42 and 43 is stopped.

The high voltage side driver 51 is arranged at the high voltage side when compared in position to the relay 42 and the relay 43.

When receiving the control signal, the high voltage side driver 51 allows or inhibits the power supply to the relay 42 and the relay 43.

The low voltage side driver 53 and the low voltage side driver 54 are arranged at a low voltage side when compared in position with the relay 42 and the relay 43. When receiving the control signal, the low voltage side driver 53 and the low voltage side driver 54 allows and inhibits the power supply to the low voltage side.

The relay 42 is arranged corresponding to the solenoid 36, and the relay 43 is arranged corresponding to the solenoid 37.

The high voltage side driver 51 is arranged at the high voltage side corresponding to both the relay 42 and the relay 43.

On the other hand, the low voltage side driver 53 is arranged at the low voltage side corresponding to the relay 42, and the low voltage side driver 54 is arranged at the low voltage side corresponding to the relay 43.

Because the engine control device 10 according to the sixth exemplary embodiment has the improved structure previously explained, it is possible for the engine control device 10 to independently execute the power supply to the motor 31 and the pushing control to the pinion gear 32. Accordingly, it is possible for the starter 30 in the engine control device 10 according to the sixth exemplary embodiment to smoothly engage the pinion gear 32 with the ring gear 4 even if the driving shaft 3 is rotating. This makes it possible to smoothly start the engine 2 when the automatic engine start condition is satisfied even if the vehicle 1 is in the inertia travelling state or the decelerating state, or in the state in which the vehicle 1 has not completely stopped.

Seventh Exemplary Embodiment

A description will be given of the engine control device 10 according to the seventh exemplary embodiment with reference to FIG. 14.

Figure 14:
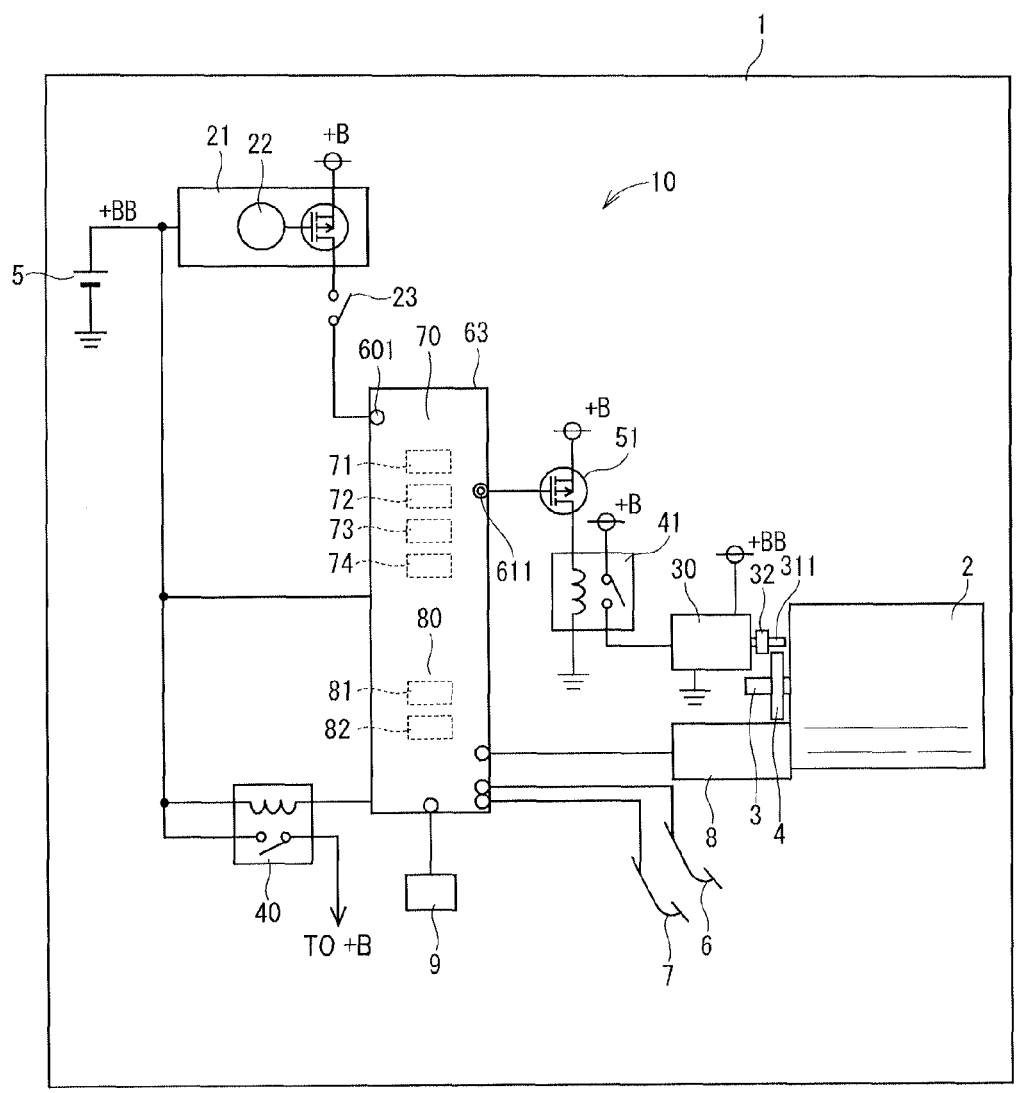
FIG. 14 is a schematic view showing an engine control device according to a seventh exemplary embodiment of the present invention and a vehicle equipped with the engine control device.

FIG. 14 is a schematic view showing the engine control device 10 according to the seventh exemplary embodiment and the vehicle 1 equipped with the engine control device 10. As shown in FIG. 14, the number of components forming the engine control device 10 according to the seventh exemplary embodiment is less than the number of components forming the engine control device 10 according to the first exemplary embodiment.

In the engine control device 10 according to the seventh exemplary embodiment, the idle stop ECU 70 and the engine ECU 80 are accommodated in a common casing 63. The engine control device 10 according to the seventh exemplary embodiment does not have the signal lines 65 which are used in the engine control device 10 according to the first exemplary embodiment.

Further, the idle stop ECU 70 and the engine ECU 80 are realized by the CPU and the ROM and the RAM. In other words, the CPU, the ROM and the RAM realize both the idle stop ECU 70 and the engine ECU 80. This structure makes it possible to reduce the total number of the ECUs used in the engine control device 10 according to the seventh exemplary embodiment, that is, which corresponds to the reduction of the total number of the casings. Other components in the engine control device 10 according to the seventh exemplary embodiment are the same of those in the engine control device 10 according to the first exemplary embodiment.

The structure of the engine control device according to the seventh exemplary embodiment can reduce the total number of the ECUs, i.e. the number of the casings. Other features of the seventh exemplary embodiment are the same of those in the first exemplary embodiment.

Because the structure of the engine control device 10 according to the seventh exemplary embodiment can reduce the total number of the casings when compared with the first exemplary embodiment, it is possible to reduce the manufacturing cost of the engine control device 10 according to the seventh exemplary embodiment, and to improve the mountability of the engine control device 10 onto the vehicle 1.

Eight Exemplary Embodiment

A description will be given of the engine control device 10 according to the eighth exemplary embodiment with reference to FIG. 15.

Figure 15:
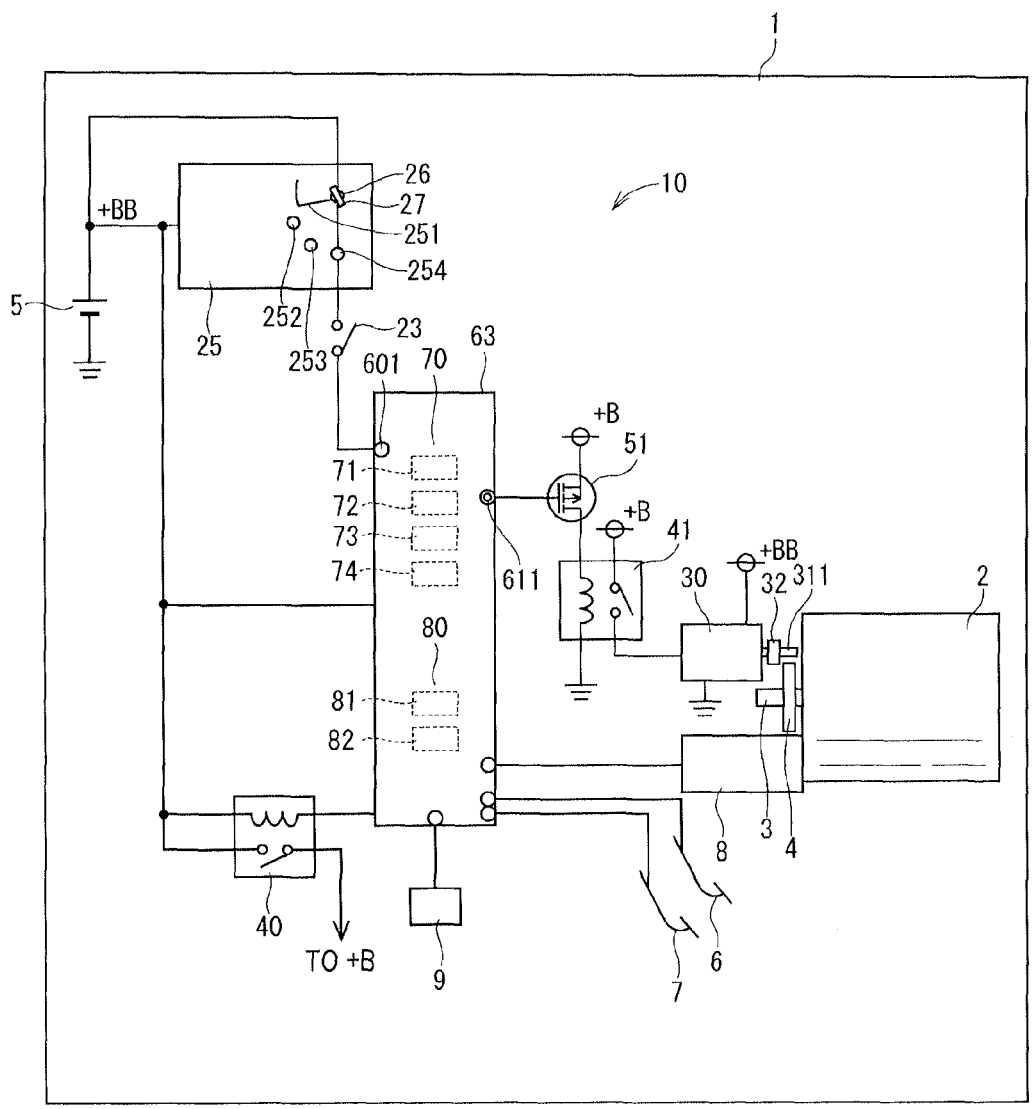
FIG. 15 is a schematic view showing an engine control device according to an eighth exemplary embodiment of the present invention and a vehicle equipped with the engine control device.

FIG. 15 is a schematic view showing the engine control device 10 according to the eighth exemplary embodiment and the vehicle 1 equipped with the engine control device 10. As shown in FIG. 15, the engine control device 10 according to the eighth exemplary embodiment has the initial engine start intention detection device which is different in structure and operation of the initial engine start intention detection device used in the seventh exemplary embodiment.

That is, the engine control device 10 according to the eighth exemplary embodiment uses the key starter 25 instead of using the push starter 21. As previously explained, the engine control device 10 according to the second exemplary embodiment uses the key starter 25. Other components of the engine control device 10 according to the eighth exemplary embodiment are the same of those in the engine control device 10 according to the seventh exemplary embodiment.

Accordingly, it is possible for the engine control device 10 according to the eighth exemplary embodiment to have the same effects provided by the engine control device 10 according to the seventh exemplary embodiment.

Ninth Exemplary Embodiment

A description will be given of the engine control device 10 according to the ninth exemplary embodiment with reference to FIG. 16.

Figure 16:
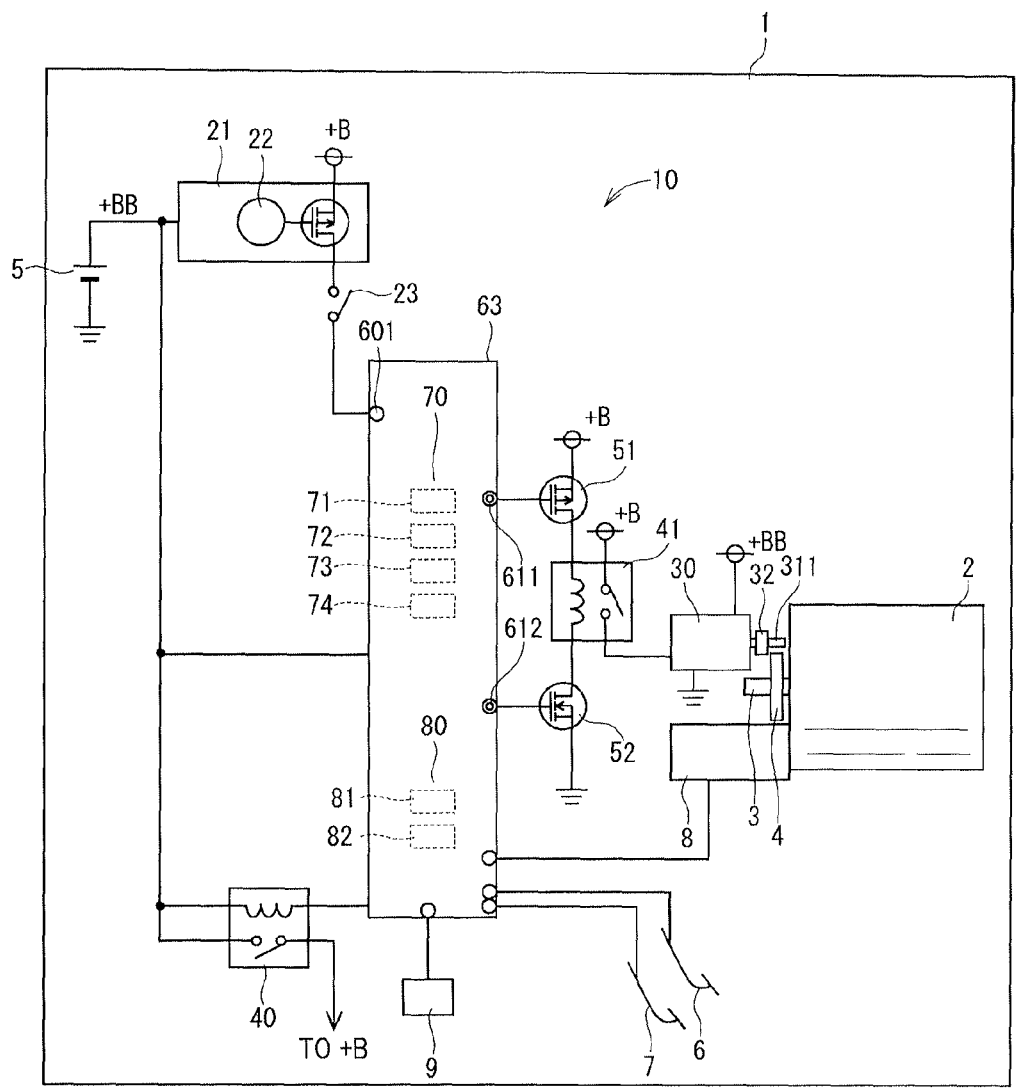
FIG. 16 is a schematic view showing an engine control device according to a ninth exemplary embodiment of the present invention and a vehicle equipped with the engine control device.

FIG. 16 is a schematic view showing the engine control device 10 according to the ninth exemplary embodiment and the vehicle 1 equipped with the engine control device 10. As shown in FIG. 16, the number of components forming the engine control device 10 according to the ninth exemplary embodiment is less than the number of components forming the engine control device 10 according to the third exemplary embodiments.

In the structure of the engine control device 10 according to the ninth exemplary embodiment shown in FIG. 16, the idle stop ECU 70 and the engine ECU 80 are accommodated in the common casing 63.

The engine control device 10 according to the ninth exemplary embodiment does not use the signal lines 65, which are used in the engine control device 10 according to the third exemplary embodiment. Still further, the idle stop ECU 70 and the engine ECU 80 use the same CPU and the same ROM and RAM. This makes it possible to reduce the total number of the casings.

Other components of the engine control device 10 according to the ninth exemplary embodiment are the same of those in the engine control device 10 according to the third exemplary embodiment.

Accordingly, it is possible for the engine control device 10 according to the ninth exemplary embodiment to reduce the total number of the ECUs, i.e. the casings. This structure makes it possible to reduce the manufacturing cost of the engine control device 10 according to the ninth exemplary embodiment, and easily mount the engine control device 10 onto the vehicle 1.

Tenth Exemplary Embodiment

A description will be given of the engine control device 10 according to the tenth exemplary embodiment with reference to FIG. 17.

Figure 17:
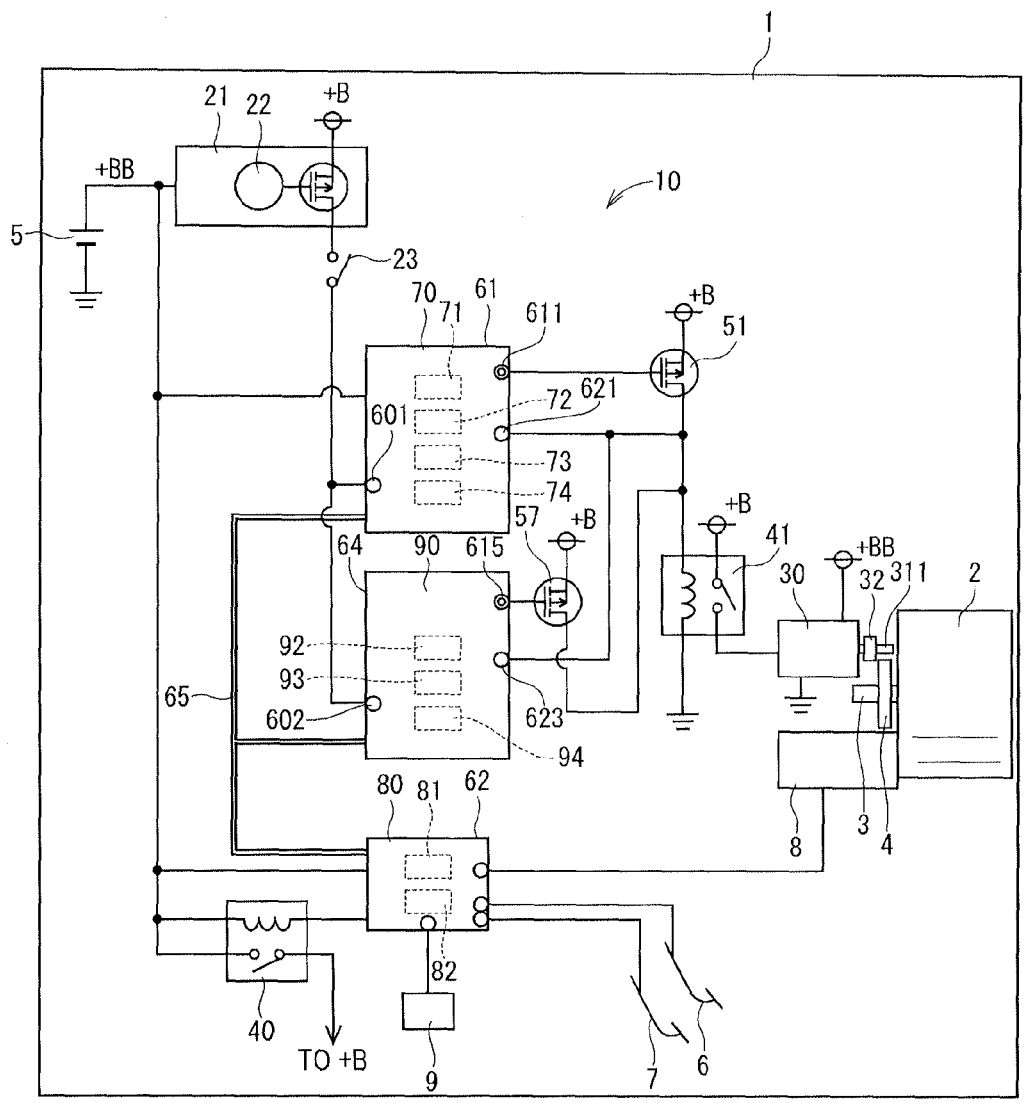
FIG. 17 is a schematic view showing an engine control device according to a tenth exemplary embodiment of the present invention and a vehicle equipped with the engine control device.

FIG. 17 is a schematic view showing the engine control device 10 according to the tenth exemplary embodiment and the vehicle 1 equipped with the engine control device 10. As shown in FIG. 17, the number of components forming the engine control device 10 according to the tenth exemplary embodiment is more than the number of components forming the engine control device 10 according to the first exemplary embodiment. The engine control device 10 according to the tenth exemplary embodiment further has an engine control unit (ECU) 90, and a high voltage side driver 57.

The structure of the ECU 90 is approximately the same as the structure of the idle stop ECU 70. The ECU 90 has various functions as an engine start control section 92, an engine start completion detection section 93 and an automatic engine stop permission section 94.

Because the engine start control section 92, the engine start completion detection section 93 and the automatic engine stop permission section 94 have the same structure and functions of the engine start control section 72, the engine restart finish detection section 73 and the automatic engine stop permission section 74 in the idle stop ECU 70, the explanation of the engine start control section 92, the engine start completion detection section 93 and the automatic engine stop permission section 94 is omitted here for brevity.

The engine control device 10 according to the tenth exemplary embodiment has both the ECU 70 and the ECU 90, each of which has approximately the same structure and function.

In a case in which it is difficult for the idle stop ECU 70 to execute the initial engine start process due to the abnormality of the idle stop ECU 70, the engine start control section 92 executes the initial engine start instead of the idle stop ECU 70.

In a case in which it is difficult for the idle stop ECU 70 to execute the initial engine start process of the engine 2 due to the abnormality of the idle stop ECU 70 and the ECU 90 executes the initial engine start process, the automatic engine stop permission section 94 inhibits the automatic engine stop control section 71 in the idle stop ECU 70 from stopping the engine 2 operating. That is, the engine start control section 92 and the automatic engine stop permission section 94 are used, when the idle stop ECU 70 is in an abnormality state, as a backup system of the idle stop ECU 70.

The casing 64 accommodates the ECU 90, and has the input section 602, the output section 615, the input section 623. The casing 64 corresponds to the first casing.

For example, the high voltage side driver 57 is a p-MOS switching element, etc. similar to the high voltage side driver 51.

The source of the high voltage side driver 57 is connected to the high voltage side terminal +B, the drain of the high voltage side driver 57 is connected to one terminal of the coil in the relay 41, and the gate of the high voltage side driver 57 is connected to the output section 615 of the ECU 90.

Each of the input section 621 of the idle stop ECU 70 and the input section 623 of the ECU 90 is connected to a connection node between the high voltage side driver 51 and the relay 41. The input section 602 of the ECU 90 is connected to the inhibitor switch 23. The idle stop ECU 70, the ECU 90 and the ECU 80 are communicated through signal lines 25.

Similar to the engine control device 10 according to the first exemplary embodiment, the idle stop ECU 70 in the engine control device 10 according to the tenth exemplary embodiment controls the operation of each of the starter 30 and the engine 2. In this case, the ECU 90 does not work, i.e. the ECU 90 does not transmit the engine start signal to the high voltage side driver 57.

On the other hand, for example, if the input section 623 of the ECU 90 has not received the monitor signal of a high level (ON, H level), which is transmitted from the high voltage side driver 51, after the push starter 21 transmits the initial engine start intention signal of a high level (ON, H level) to the input section 602 of the ECU 90, the ECU 90 judges that the idle stop ECU 70 is abnormal. Accordingly, the ECU 90 executes the initial engine start process instead of the idle stop ECU 70.

As previously explained, in the structure of the engine control device 10 according to the tenth exemplary embodiment makes it possible for the ECU 90 to execute the initial engine start process of the engine 2 when the idle stop ECU 70 is abnormal. This can increase the reliability of the initial engine start process of the engine control device 10.

Other Modifications

The concept of the present invention is not limited by the first to tenth exemplary embodiments previously described. It is possible to combine the components used in the engine control devices 10 according to the first to tenth exemplary embodiments. For example, it is acceptable to combine the second exemplary embodiment and the sixth exemplary embodiment. In this combination, the key starter 25 is used as the initial engine start intention detection device, and the starter 30 has the two solenoids 36, 37 and is used as the engine starter devices.

In the structure of each of the first to sixth exemplary embodiments, the casing 61 as the first casing accommodates the automatic engine stop control section 71, the engine start control section 72, the engine restart finish detection section 73, the automatic engine stop permission section 74, and the casing 62 as the second casing accommodates the vehicle state detection section 81 and the continuous rotation detection section 82.

However, the concept of the present invention is not limited by this structure. For example, it is acceptable for each of the casing 61 and the casing 62 to accommodate any combination of the automatic engine stop control section 71, the engine start control section 72, the engine restart finish detection section 73, the automatic engine stop permission section 74 and the second casing accommodates the vehicle state detection section 81 and the continuous rotation detection section 82.

In the structure of the engine control device 10, the first to Each of the automatic engine stop control section 71, the engine start control section 72, the engine restart finish detection section 73, the automatic engine stop permission section 74, the second casing accommodates the vehicle state detection section 81 and the continuous rotation detection section 82 acts as a functional section.

Further, in the structure of the engine control device 10 according to the tenth exemplary embodiment, the idle stop ECU 70 controls the operation of the starter 30 and the engine 2 so as to execute the initial engine start and the automatic engine restart after the automatic engine stop. When the idle stop ECU 70 becomes abnormal, the ECU 90 executes the initial engine start process only.

However, the concept of the present invention is not limited by this structure. For example, it is acceptable to have a structure in which the ECU 90 has same functions as the automatic engine stop control section 71 in the idle stop ECU 70. In this structure, the idle stop ECU 70 controls the operation of the starter 30 and the engine 2 so as to execute the initial engine start and the automatic engine restart after the automatic engine stop. When the idle stop ECU 70 becomes abnormal, the ECU 90 executes the initial engine start and the automatic engine restart after the automatic engine stop in addition to the initial engine start process.

It is also acceptable to have a structure in which the ECU 90 controls the operation of the starter 30 and the engine 2 so as to execute the initial engine start and the automatic engine restart after the automatic engine stop. When the ECU 90 becomes abnormal, the idle stop ECU 70 executes the control of the starter 30 and the engine 2. That is, this structure of the engine control device allows one of the idle stop ECU 70 and the ECU 90 to be used as a main control device. Still further, it is acceptable for each of the idle stop ECU 70 and the ECU 90 to execute any functions so as to control the starter 30 and the engine 2 simultaneously.

The engine control device 10 according to each of the first to tenth exemplary embodiments has the structure in which the vehicle state detection section 81 detects whether the vehicle 1 is in the acceleration state, the inertia travelling state, the decelerating state and the stopped state on the basis of the detection signal transmitted from the speed sensor 9. However, the concept of the present invention is not limited by this structure. For example, it is acceptable for the vehicle state detection section 81 to detect the vehicle state on the basis of an acceleration sensor capable of detecting an acceleration of the vehicle 1, for example.

The engine control device 10 according to each of the first to tenth exemplary embodiments has the engine ECU 80 which has the vehicle state detection section 81 and the continuous rotation detection section 82. However, the concept of the present invention is not limited by this structure. For example, it is acceptable for the control device 10 to have the engine ECU 80 without the vehicle state detection section 81 and the continuous rotation detection section 82. In this structure, the engine control device 10 can detect the vehicle state, i.e. the condition of the vehicle 1 on the basis of the detection signal transmitted from the speed sensor 9, and detect whether or not the engine 2 is in the continuous operation state, and detect whether or not the engine start process has been finished on the basis of the detection signal transmitted from the crank angle sensor 8.

In the structure of the engine control device 10 according to each of the first to tenth exemplary embodiments, the engine ECU 80 releases the engine 2 from the transmission assembly when the vehicle is running under the inertia travelling state.

However, the concept of the present invention is not limited by this structure. For example, it is acceptable for the engine ECU 80 to maintain the connection between the engine 2 and the transmission assembly when the vehicle 1 is running in the inertia travelling state.

It is also acceptable for the engine control device 10 to detect the satisfaction of each of the automatic engine stop condition and the automatic engine restart condition on the basis of one or more the depressed depth of each of the accelerator pedal 6 and the brake pedal 7, and the detection signals which are transmitted from the crank angle sensor 8, the speed sensor 9, and other sensors.

The engine control device 10 according to each of the first to tenth exemplary embodiments uses the starter 30 as the engine start device. However, the concept of the present invention is not limited by this structure. For example, it is acceptable to use an integrated starter generator (ISG) or a motor generator (MG) instead of using the starter 30. The ISG is used for executing the engine start process by power running and generating regenerative power. The MG is often amounted on hybrid vehicles, etc., and used for executing the engine start process by power running and generating regenerative power.

Further, it is acceptable to assign a part of the functions or the overall functions of the engine control device 10 to one or more multiple integrated circuits (ICs). Still further, it is possible to use one or more programs, stored in a non-transitory computer readable storage medium, capable of causing a central processing unit in a computer system to execute the functions of the engine control device 10.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An engine control device to be mounted on a vehicle, the vehicle comprising an internal combustion engine, an initial engine start intention detection device, and an engine start device, wherein
   the initial engine start intention detection device is capable of detecting a driver's initial engine start intention to start the internal combustion engine and generating and transmitting an initial engine start intention signal which corresponds to the detected driver's initial engine start intention, and
   the engine start device is capable of rotating a driving shaft of the internal combustion engine when receiving electric power so as to execute an engine start of the internal combustion engine,
   the engine control device, using a processor, comprising:
   an automatic engine stop control section capable of automatically stopping the internal combustion engine operating when an automatic engine stop condition is satisfied;
   an engine start control section capable of supplying electric power to the engine start device so as to drive the engine start device when receiving the initial engine start intention signal transmitted from the initial engine start intention detection device and an automatic engine start condition is satisfied;
   an engine start completion detection section capable of detecting whether the engine start of the internal combustion engine has finished; and
   an automatic engine stop permission section capable of permitting the automatic engine stop control section to stop the engine operating when the automatic engine stop permission section detects that the engine start of the internal combustion engine has finished at a timing when the engine start control section starts the operation of the internal combustion engine after the engine start control section receives the initial engine start intention detection device transmitted from the initial engine start intention detection device.

2. The engine control device according to claim 1, further comprising an engine state detection section capable of detecting a vehicle's state, wherein
   the automatic engine stop control section is capable of stopping the internal combustion engine operating when the engine state detection section detects that the vehicle is in one of an inertia travelling state, a decelerating state and a stopped state, and the automatic engine stop condition has been satisfied.

3. The engine control device according to claim 1, further comprising a continuous operation detection section capable of detecting whether the internal combustion engine is in a continuous operation state in which the internal combustion engine continuously operates, wherein
   the engine start completion detection section detects that the engine start of the internal combustion engine has been finished when the continuous operation detection section detects that the internal combustion engine continuously operates.

4. The engine control device according to claim 3, wherein the continuous rotation detection section detects that the internal combustion engine is in the continuous operation state when a rotation speed of the internal combustion engine exceeds a predetermined rotation speed.

5. The engine control device according to claim 3, further comprising;
   a first casing capable of accommodating at least the engine start completion detection section;
   a second casing capable of accommodating at least the continuous operation detection section; and
   signal lines capable of connecting the engine start completion detection section to the continuous operation detection section, and transmitting signals between the engine start completion detection section and the continuous operation detection section,
   wherein the continuous operation detection section transmits a detection signal thereof, which corresponds to a detection result thereof, to the engine start completion detection section through the signal lines.

6. The engine control device according to claim 1, wherein the engine start control section inhibits power supply to the engine start device during the start of the internal combustion engine when the engine start completion detection section detects that the engine start of the internal combustion engine has finished.

7. The engine control device according to claim 1, wherein the engine start control section continues power supply to the engine start device while receiving the initial engine start intention signal transmitted from the initial engine start intention detection device.

8. The engine control device according to claim 1, further comprising a signal transmission permission section capable of permitting a signal transmission between the initial engine start intention detection device and the engine start control section when a predetermined condition is satisfied.

9. The engine control device according to claim 1, wherein the initial engine start intention detection device is a push starter comprising a button to which the driver of the vehicle pushes.

10. The engine control device according to claim 1, wherein the initial engine start intention detection device is a key starter comprising a hose lection into which the driver of the vehicle inserts and turns a key.

11. The engine control device according to claim 1, further comprising:
    a relay capable of permitting power supply to the engine start device when receiving electric power, and inhibiting the power supply to the engine start device when receiving no electric power;
    a high voltage side driver arranged at a high voltage side when compared in position with the relay, and being capable of permitting power supply to the relay when receiving a control signal, and inhibiting the power supply to the relay when receiving no control signal; and
    a low voltage side driver, arranged at a low voltage side when compared in position with the relay and being capable of permitting power supply from the relay to the low voltage side when receiving a control signal, and inhibiting the power supply from the relay to the low voltage side when receiving no control signal.

12. The engine control device according to claim 1, wherein the engine start device comprises:
    a motor capable of rotating when receiving electric power,
    a pinion gear fixed to the motor, and being capable of rotating when the motor is rotating;
    a motor power supply permission section capable of permitting power supply to the motor when receiving electric power; and
    a pushing section capable of pushing the pinion gear, when receiving electric power, to the ring gear fixed to the driving shaft of the internal combustion engine so as to engage the pinion gear with the ring gear.

13. The engine control device according to claim 12, further comprising:
    a relay capable of permitting power supply to the engine start device when receiving electric power, and inhibiting the power supply to the engine start device when receiving no electric power;
    a high voltage side driver arranged at a high voltage side when compared in position with the relay, and being capable of permitting power supply to the relay when receiving a control signal, and inhibiting the power supply to the relay when receiving no control signal; and
    a low voltage side driver, arranged at a low voltage side when compared in position with the relay and being capable of permitting power supply from the relay to the low voltage side when receiving a control signal, and inhibiting the power supply from the relay to the low voltage side when receiving no control signal,
    wherein the relay is provided to each of the motor power supply permission section and the pushing section,
    the high voltage side driver is provided commonly for each of the relays arranged for the motor power supply permission section and the pushing section,
    the low voltage side driver is provided for each of the relays at the low voltage side.

14. The engine control device according to claim 12, wherein the engine start control section is capable of supplying electric power to the motor power supply permission section when the automatic engine start condition has satisfied during the rotation of the driving shaft so as to rotate the motor and a rotation speed of the pinion gear being approximately the same as a rotation speed of the ring gear, and
    the engine start control section is capable of supplying electric power to the pushing section so as to push the pinion gear to the ring gear, and to engage the pinion gear with the ring gear in order to start the internal combustion engine.

15. The engine control device according to claim 1, further comprising a bypass start section arranged between the initial engine start intention detection device and the engine start device so as to bypass the engine start control section,
    wherein when receiving the initial engine start intention signal transmitted from the initial engine start intention detection device, the bypass start section allows the power supply to the engine start device so as to drive the engine start device to start the operation of the internal combustion engine.

16. The engine control device according to claim 15, wherein the automatic engine stop permission section inhibits the engine stop of the internal combustion engine by the automatic engine stop control section when the internal combustion engine has been started by the bypass start section.

* * * * *